United States Patent
Amstein et al.

(10) Patent No.: US 12,151,595 B2
(45) Date of Patent: Nov. 26, 2024

(54) SEAT RAIL PAIR FOR LONGITUDINAL ADJUSTMENT OF A VEHICLE SEAT AND ENERGY ABSORBER AND LOCKING DEVICE, IN PARTICULAR FOR SUCH A SEAT RAIL PAIR

(71) Applicants: Brose Fahrzeugteile SE & Co. Kommanditgesellschaft, Coburg, Coburg (DE); Bayerische Motoren Werke AG, Munich (DE)

(72) Inventors: Marcel Amstein, Marisfeld (DE); Ramzi Ouafi, Coburg (DE); Jochen Hofmann, Marktgraitz (DE); Sven Sinne, Untersiemau (DE); Frank Richter, Halle (DE); Fabian Pohlmann, Coburg (DE); Michael Leng, Geltendorf (DE); Dieter Strasser, Oberhausen (DE); Andreas Huf, Neusäß (DE)

(73) Assignees: BROSE FAHRZEUGTEILE SE & CO. KOMMANDITGESELLSCHAFT, COBURG, Coburg (DE); BAYERISCHE MOTOREN WERKE AG, Munich (DE)

( * ) Notice: Subject to any disclaimer, the term of this patent is extended or adjusted under 35 U.S.C. 154(b) by 147 days.

(21) Appl. No.: 17/916,099

(22) PCT Filed: Mar. 12, 2021

(86) PCT No.: PCT/EP2021/056381
§ 371 (c)(1),
(2) Date: Sep. 30, 2022

(87) PCT Pub. No.: WO2021/197809
PCT Pub. Date: Oct. 7, 2021

(65) Prior Publication Data
US 2023/0158924 A1    May 25, 2023

(30) Foreign Application Priority Data
Mar. 30, 2020 (DE) ............... 10 2020 108 799.3

(51) Int. Cl.
*B60N 2/06* (2006.01)
*B60N 2/02* (2006.01)
(Continued)

(52) U.S. Cl.
CPC ......... *B60N 2/067* (2013.01); *B60N 2/02246* (2023.08); *B60N 2/0244* (2013.01);
(Continued)

(58) Field of Classification Search
CPC ............ B60N 2/42781; B60N 2/42772; B60N 2/42727; B60N 2/42709; B60N 2/4214;
(Continued)

(56) References Cited

U.S. PATENT DOCUMENTS 3,669,397 A * 6/1972 Le Mire ............. B60N 2/42736
                                                      297/216.19
5,273,240 A   12/1993 Sharon
(Continued)

FOREIGN PATENT DOCUMENTS

DE    19613506 A1    10/1997
DE    19858432 A1    7/2000
(Continued)

OTHER PUBLICATIONS

Search Report of the GPTO for Corresponding German Application No. DE102020108799.3 dated Feb. 25, 2021 and its English Machine Translation.
(Continued)

*Primary Examiner* — Eret C McNichols
(74) *Attorney, Agent, or Firm* — McCoy Russell LLP

(57) ABSTRACT

Disclosed is a seat rail pair (2) for adjustment of a vehicle seat (8), in particular of a motor vehicle seat, in an adjust-
(Continued)

Figure 2A:
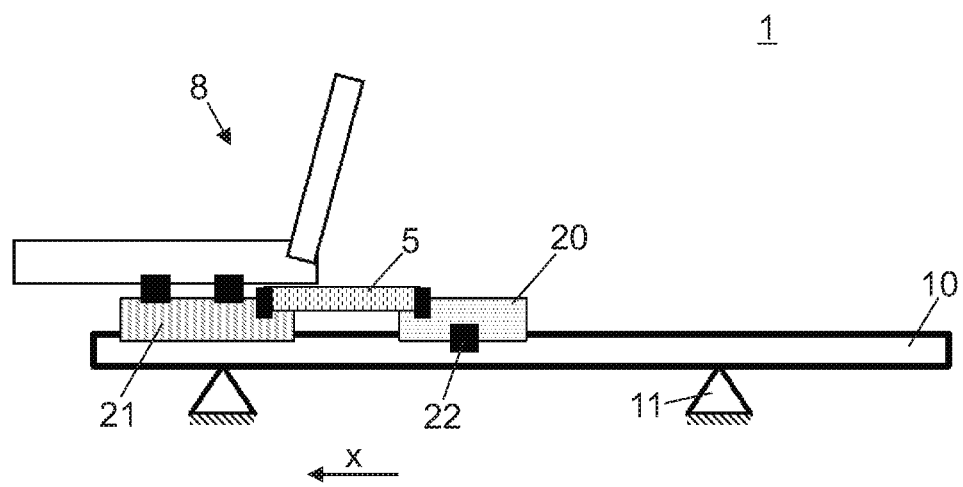

ment direction (x), comprising a guide rail (10) extending parallel to the adjustment direction (x) for fastening to a vehicle floor, and a fastening rail (21), which is adjustably guided on the guide rail (10) in the adjustment direction (x) for fastening the vehicle seat (8), wherein an energy absorber element (5) is provided in a path, which introduces the force acting on the vehicle seat (8) into the vehicle structure, which energy absorber element permits a movement of the vehicle seat in the adjustment direction (x) under plastic deformation when a predetermined value of the force is exceeded.

33 Claims, 19 Drawing Sheets

(51) Int. Cl.
  *B60N 2/42* (2006.01)
  *B60N 2/427* (2006.01)
(52) U.S. Cl.
  CPC ....... *B60N 2/4214* (2013.01); *B60N 2/42709* (2013.01); *B60N 2/4279* (2013.01)
(58) Field of Classification Search
  CPC   B60N 2/4279; B60N 2/0244; B60N 2/02246; B60N 2/067
  See application file for complete search history.

(56) References Cited

U.S. PATENT DOCUMENTS

| | | | | |
|---|---|---|---|---|
| 5,564,315 A * | 10/1996 | Schuler | | B60N 2/0825 248/424 |
| 5,913,947 A * | 6/1999 | Groche | | B60N 2/0715 248/429 |
| 6,352,312 B1 * | 3/2002 | Rees | | B60N 2/072 297/216.16 |
| 6,398,285 B2 * | 6/2002 | Motozawa | | B62D 21/152 296/68.1 |
| 6,764,054 B2 * | 7/2004 | Becker | | B60N 2/0818 248/424 |
| 7,207,541 B2 * | 4/2007 | Frohnhaus | | B60N 2/0715 297/216.16 |
| 7,963,603 B2 * | 6/2011 | Pywell | | F16F 9/5165 297/216.19 |
| 8,052,195 B2 * | 11/2011 | Aufrere | | B60N 2/42745 296/68.1 |
| 8,800,948 B2 * | 8/2014 | Wakayama | | B60N 2/0705 296/65.13 |
| 9,120,400 B2 * | 9/2015 | Ruthmann | | B60N 2/0806 |
| 10,046,672 B2 * | 8/2018 | Kuroda | | B60N 2/0715 |
| 2002/0084131 A1 * | 7/2002 | Motozawa | | B60N 2/42781 180/274 |
| 2004/0026975 A1 * | 2/2004 | Rausch | | B60N 2/0715 297/344.1 |
| 2004/0183344 A1 * | 9/2004 | Glance | | B60N 2/42709 297/216.1 |
| 2008/0106107 A1 | 5/2008 | Tan et al. | | |
| 2008/0315662 A1 | 12/2008 | Suck et al. | | |
| 2020/0171986 A1 | 6/2020 | Hopfner | | |
| 2020/0307425 A1 | 10/2020 | Hopfner | | |
| 2022/0274513 A1 * | 9/2022 | Höcks | | B60N 2/0715 |
| 2024/0042902 A1 * | 2/2024 | Jonsson | | B60N 2/01575 |

FOREIGN PATENT DOCUMENTS

| | | | | |
|---|---|---|---|---|
| DE | 202006004613 U1 | 4/2007 | | |
| DE | 202007012746 U1 | 1/2008 | | |
| DE | 202007006376 U1 | 10/2008 | | |
| DE | 102007027410 A1 | 12/2008 | | |
| DE | 102008025135 A1 * | 12/2009 | ............ | B60N 2/015 |
| DE | 102014211510 A1 | 12/2015 | | |
| DE | 102017213312 A1 | 2/2019 | | |
| DE | 102017215929 A1 | 3/2019 | | |
| EP | 1197429 B1 | 12/2004 | | |
| EP | 2048407 A1 | 4/2009 | | |
| GB | 2355399 A * | 4/2001 | .......... | B60N 2/0715 |
| WO | 2011147991 A1 | 12/2011 | | |
| WO | 2013046200 A1 | 4/2013 | | |

OTHER PUBLICATIONS

International Search Report for PCT/EP2021/056381 dated Aug. 31, 2021 and its English Machine Translation.

* cited by examiner

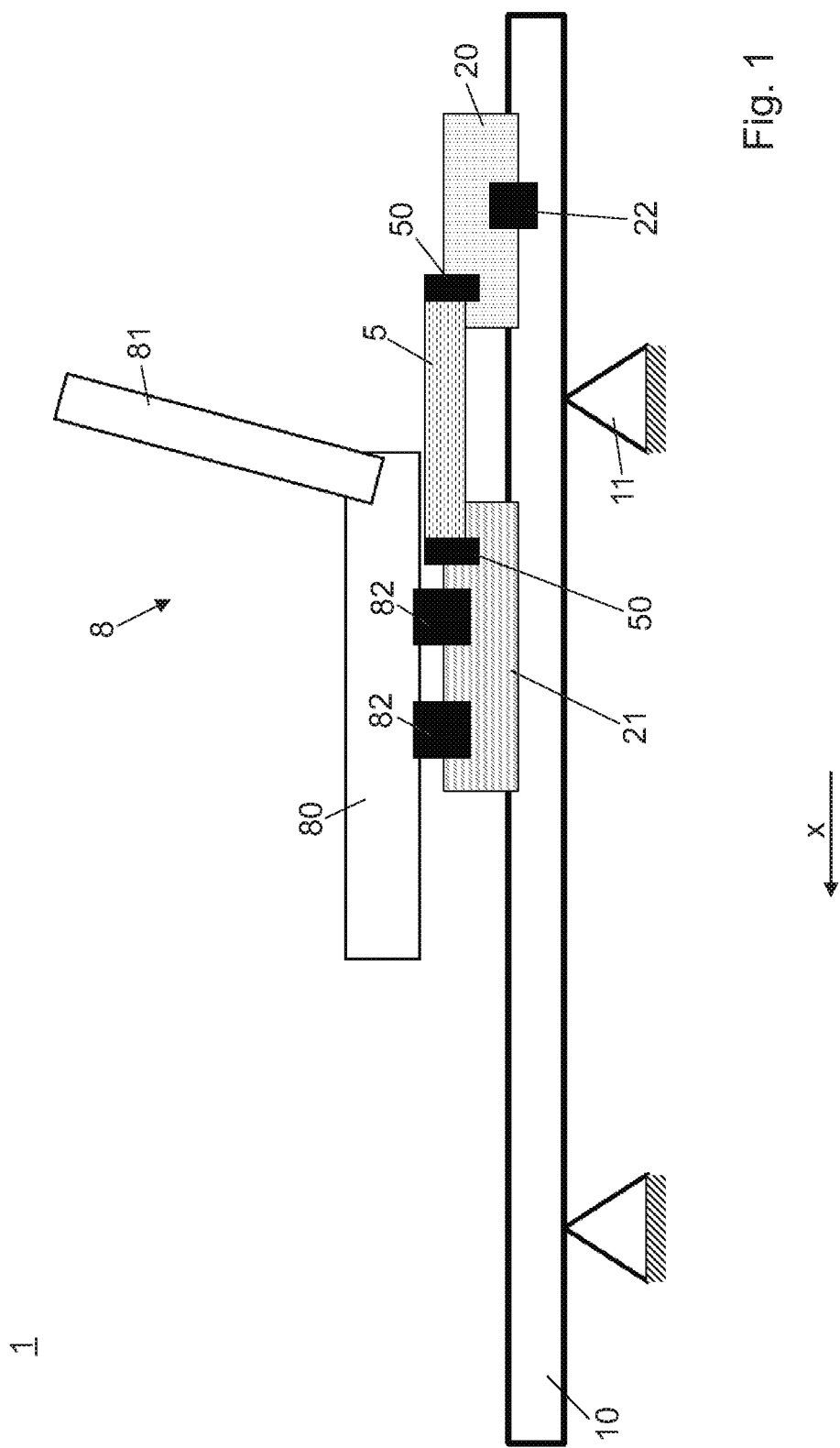

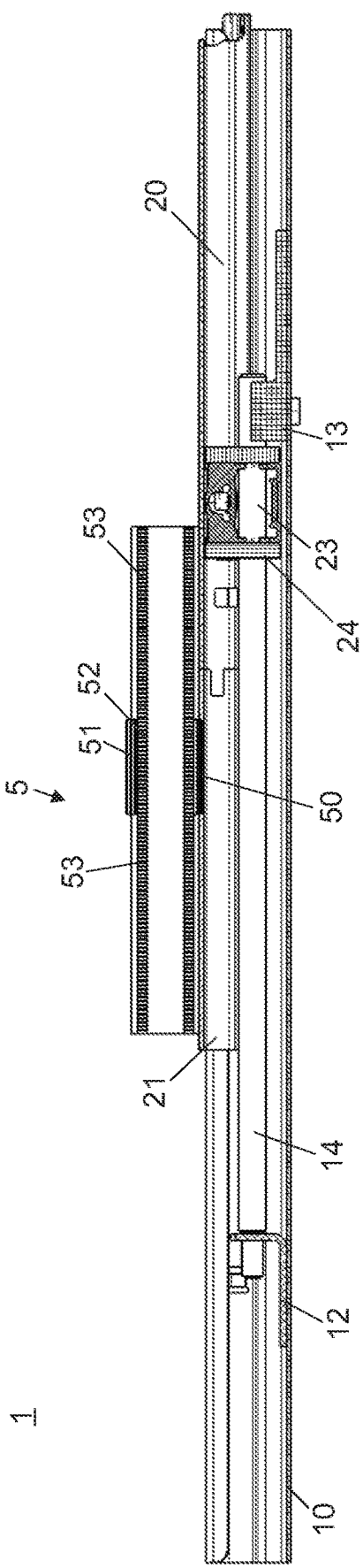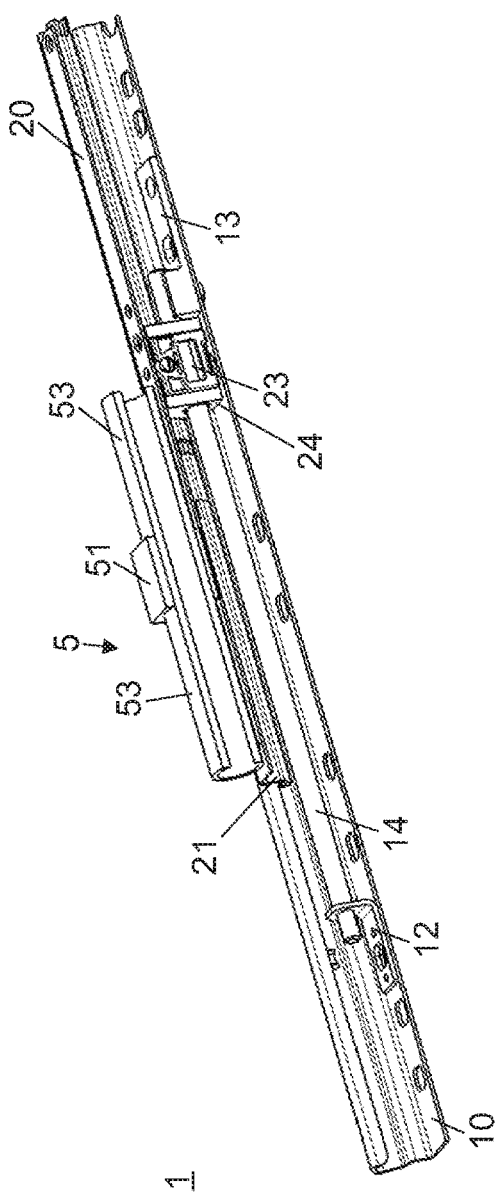

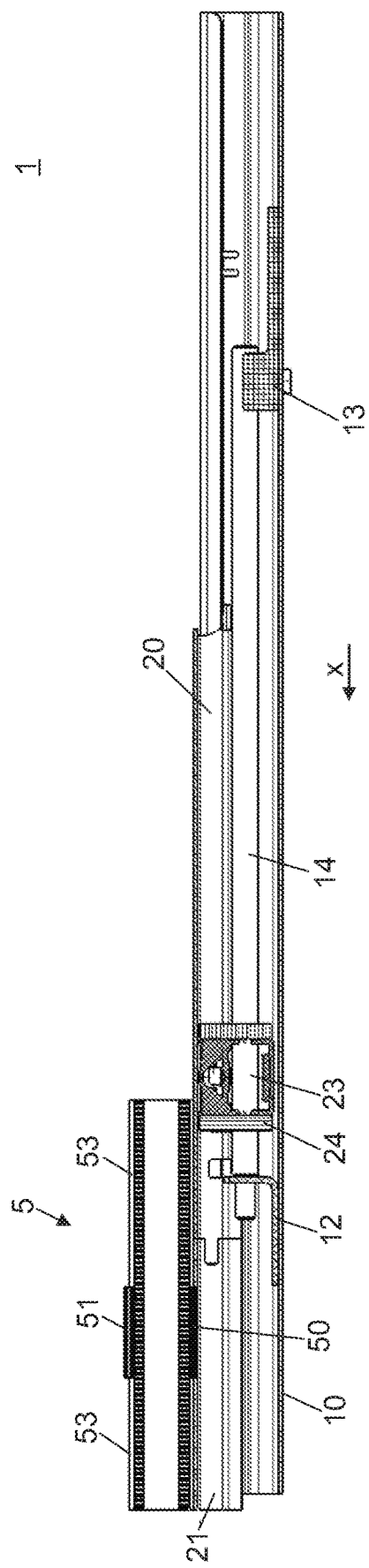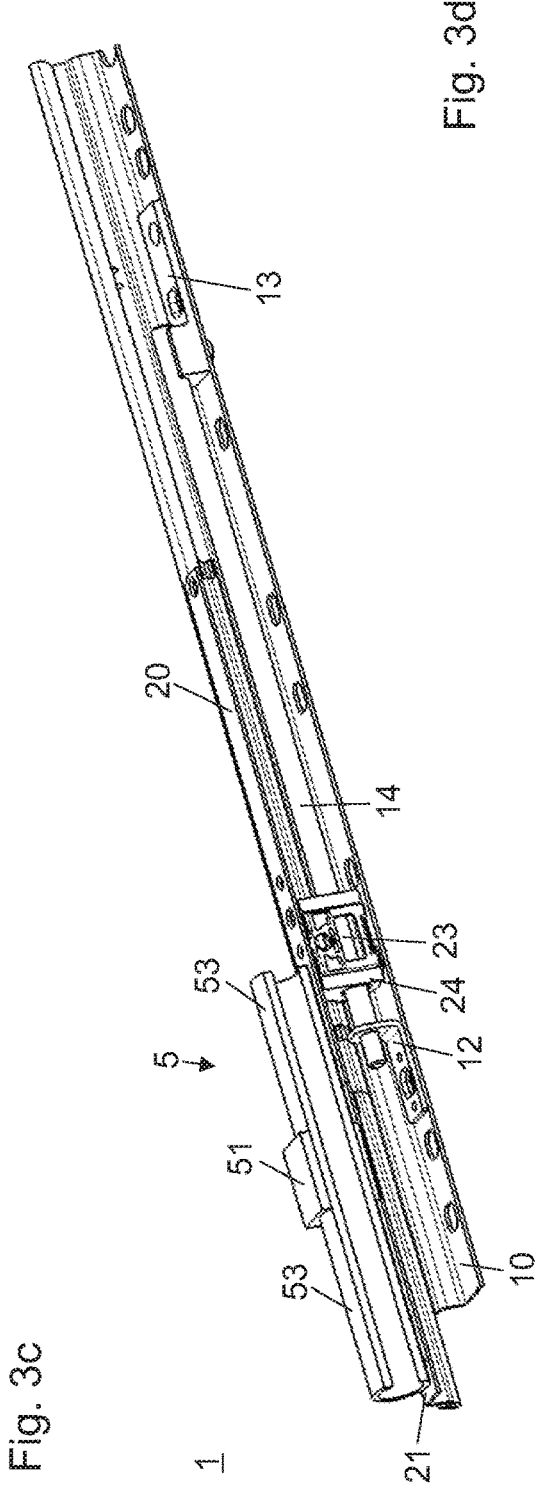

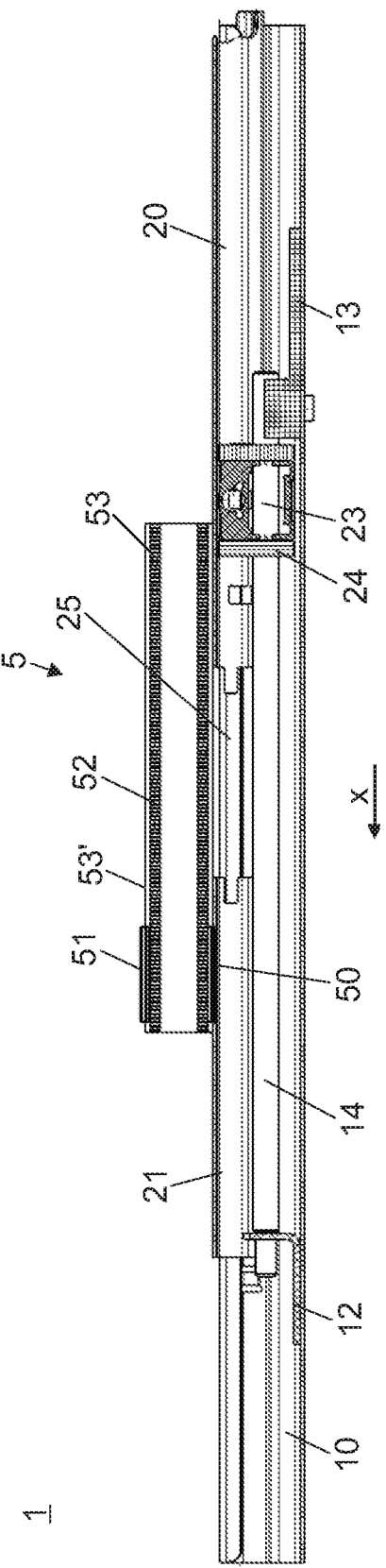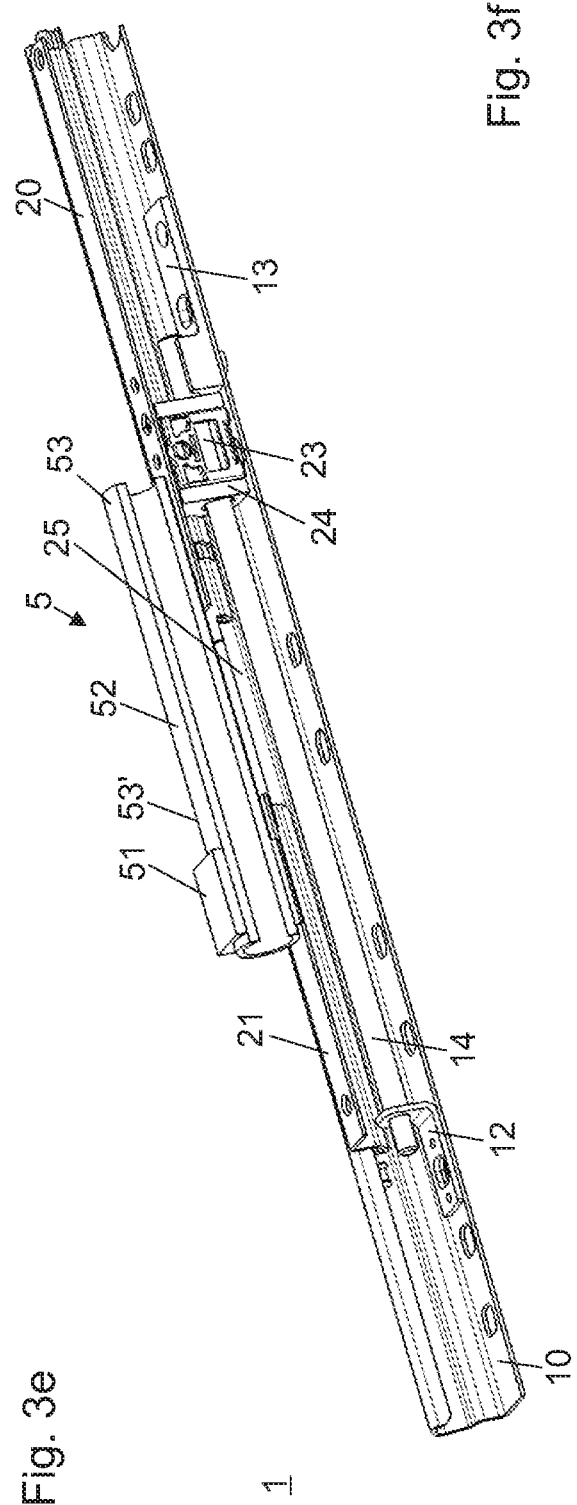

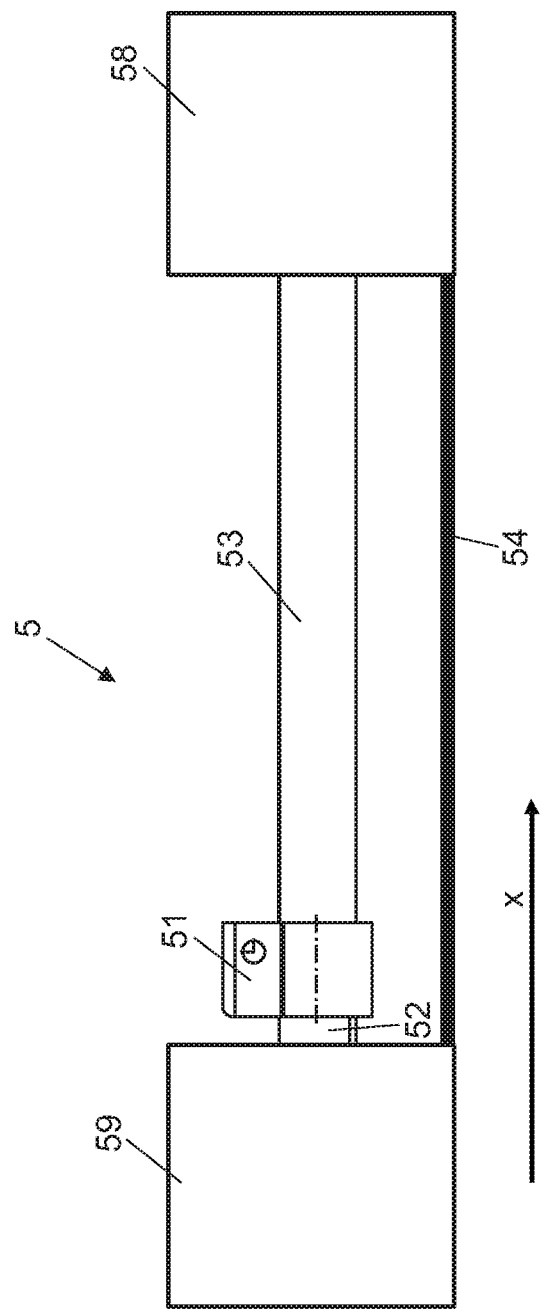

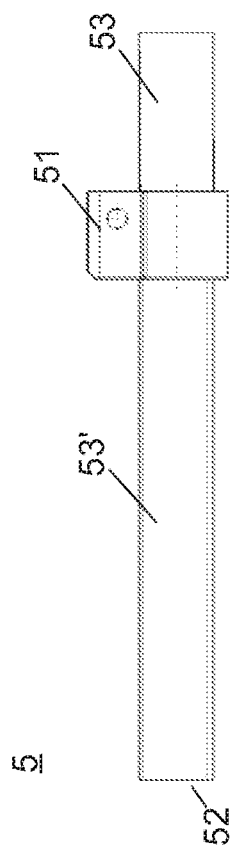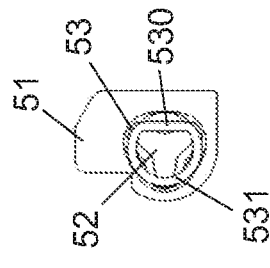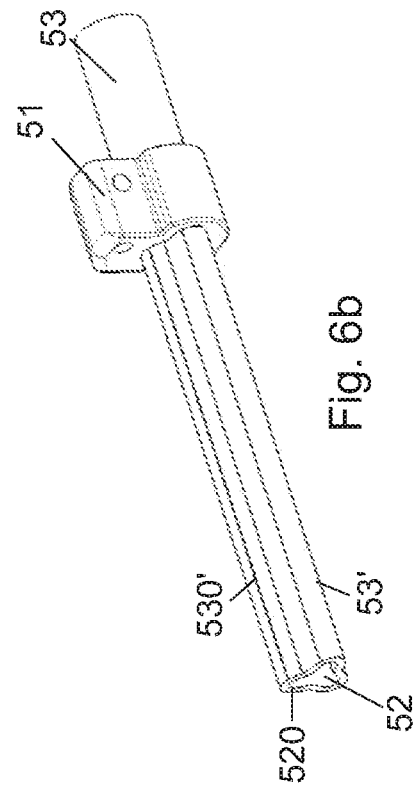

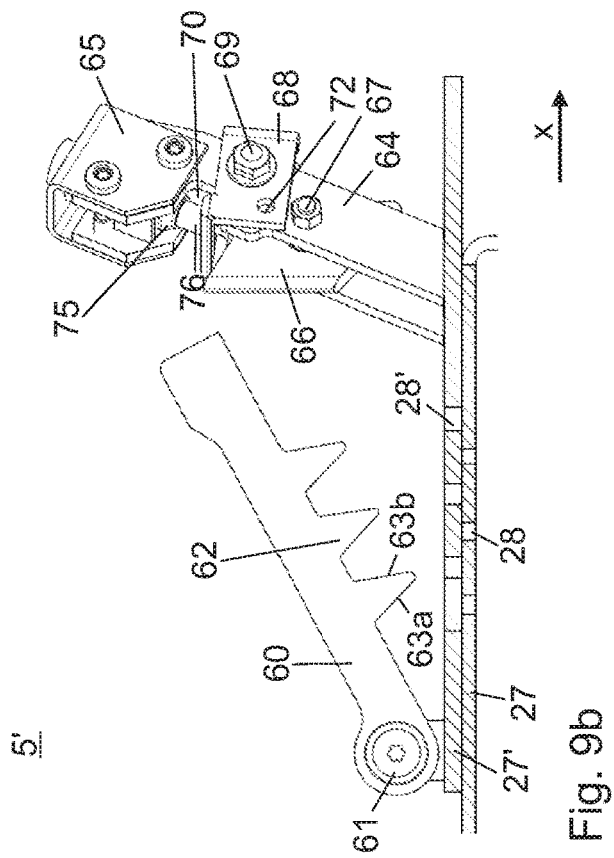
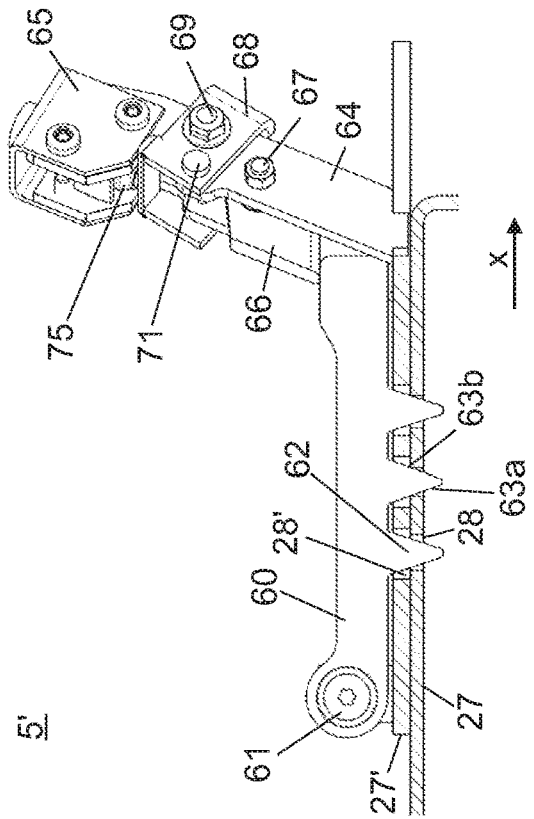

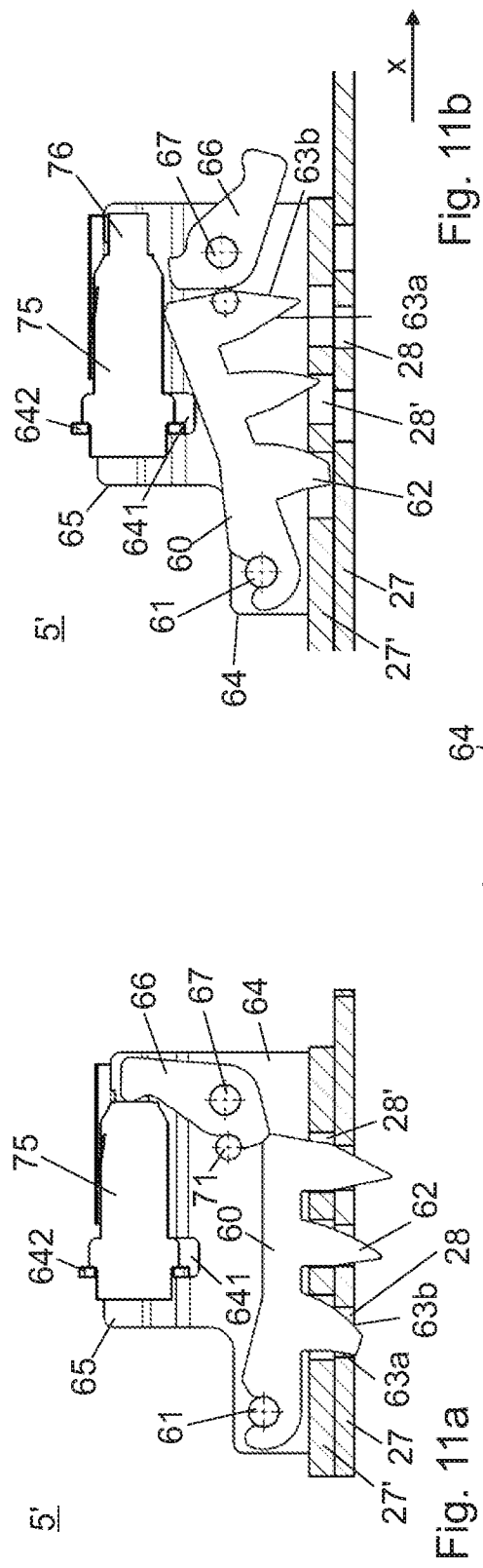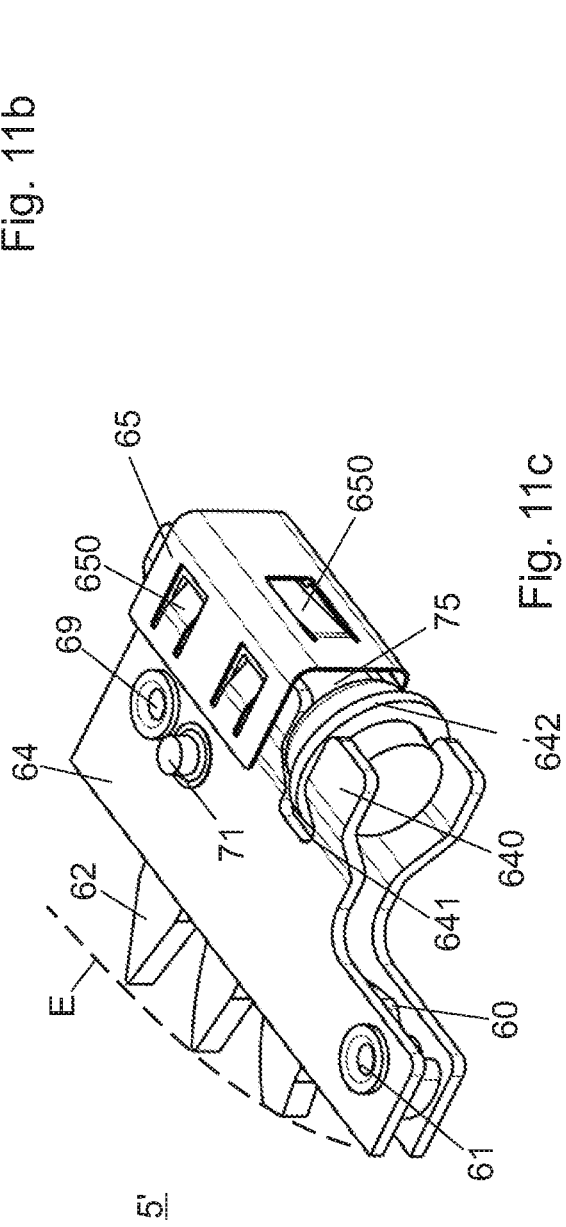

SEAT RAIL PAIR FOR LONGITUDINAL ADJUSTMENT OF A VEHICLE SEAT AND ENERGY ABSORBER AND LOCKING DEVICE, IN PARTICULAR FOR SUCH A SEAT RAIL PAIR

This application is a national phase of International Application No. PCT/EP2021/056381 filed 12 Mar. 2021, which claims priority to German Patent Application No. 10 2020 108 799.3 filed 30 Mar. 2020, each of which is hereby incorporated herein by reference in its entirety.

FIELD OF THE INVENTION

The present invention relates generally to adjusting the position of a vehicle seat in an adjustment direction, and more particularly relates to provisions for dissipating energy in or on a vehicle seat in the event of a crash. Further aspects of the present invention relate to an energy absorber for converting crash energy in a vehicle by deformation of a deformation member, and to a locking device for releasably locking a first component which is slidably guided in an adjustment direction relative to a second component in a vehicle interior of a motor vehicle.

PRIOR ART

A seat rail pair for adjustment of a motor vehicle seat in an adjustment direction, which usually coincides with the longitudinal direction of the vehicle, and for locking a desired position of the motor vehicle seat in the adjustment direction as claimed in the preamble of claim 1 is disclosed in DE 196 13 506 A1. The lower rail is embraced over part of its length from below by a carriage bent from a sheet metal, which forms an outwardly projecting detent strip on its one lateral leg and is firmly connected to the lower rail by a rivet. A detent plate rests on the upper side of the upper rail and is firmly connected to the upper rail and provided with detent holes in an area overlapping the detent strip, which are aligned with the detent holes of the detent strip of the carriage in the selectable longitudinal adjustment positions of the seat. When the seat is locked, detent pins engage through the aligned detent holes. In the area of its underside, the carriage is provided with a row of apertures running in the longitudinal direction of the lower rail, which are separated from each other by transverse webs. A wedge body fixed to the underside of the lower rail engages in the foremost of the apertures, the wedge section of which is directed against the transverse webs. The transverse webs each act as energy-absorbing elements in the event of a crash, dissipating crash energy by deformation.

Although the structure of the seat rail pair is relatively compact, in the case of electric longitudinal adjustment of the vehicle seat, a large number of additional components are arranged in a path that introduces the force acting on the vehicle seat into the vehicle structure, which further influence the dissipation of crash energy, so that it is difficult to specifically influence the dissipation of crash energy.

WO 2013/046200 A1 discloses the installation of an energy absorber element designed as a tubular hollow profile directly between the two rails of a seat rail pair for adjustment of a motor vehicle seat. The coupling of an electric drive for adjusting the upper rail relative to the lower rail is not provided.

Energy absorbers are known from the prior art, in which rod-shaped or tubular components are selectively deformed, for example by folding, buckling, bending, tearing and the like, in order to reduce or convert crash energy in a vehicle. These energy absorbers are very complex to manufacture and design. The definition of nominal fracture/target deformation portions must be designed via elaborate tests. The force/energy levels are very strongly dependent on the geometry, material tolerances, friction, crash or speed of deformation, etc. This results in very large tolerances in the conversion of the crash energy. As a result, the amounts of residual crash energy, acceleration and external forces acting on the vehicle occupants vary greatly, making the design of safety systems even more difficult. Highly fluctuating energy conversion characteristics may additionally cause force pulses to act on the body or the vehicle occupant, which can have a detrimental effect. Furthermore, the known crash elements can usually only be designed for one energy conversion level/force level. These energy absorbers are installed primarily in the vehicle body. Examples of such energy absorbers are disclosed in DE 10 2007 051 815 B4, DE 198 58 432 A1, DE 20 2007 012 746 U1 or DE 10 2014 211 510 A1.

EP 1 197 429 A2 discloses an energy absorber for absorbing energy from a vehicle in an impact situation. The energy absorber comprises a first part, a second part, and an elongated deformable member attached to the first part and extending through a deformation structure carried by the second part. The elongated deformable member normally acts as a connecting member or strut between the first part and the second part. When the force acting between the first part and the second part in a predetermined direction exceeds a predetermined amount, the elongated deformable member is progressively forced through the deformation structure as the distance between the first part and the second part changes, thereby forcing the deformable member to undergo plastic deformation. The deformation structure is configured to cause plastic deformation with substantially no change in the cross-sectional area of material of the deformable member, to provide a relatively gradual retardation.

SUMMARY OF THE INVENTION

It is an object of the present invention to provide a seat rail pair for adjustment of a vehicle seat in an adjustment direction, for which a reduction in crash energy can be selectively specified in a simple and reproducible manner by means of a simple and inexpensive structure. According to a further aspect of the present invention, there is to be provided an energy absorber for converting crash energy in a vehicle by deformation of a deformation member, which enables a very well controllable and reproducible conversion of crash energy. According to a further aspect of the present invention, there is to be provided a locking device for releasably locking a first component which is guided so that it can be displaced in an adjustment direction relative to a second component in a vehicle interior of a motor vehicle, in particular for releasably locking a component of a vehicle seat once, which locking device can be manufactured in a simple and inexpensive manner and can be reliably and very quickly unlocked. According to a further aspect of the present invention, there is to be provided a vehicle seat which is fastened to a fastening rail of such a seat rail pair.

As claimed in a first aspect of the present invention, there is provided a seat rail pair for adjustment of a vehicle seat, in particular a motor vehicle seat, in an adjustment direction, comprising a guide rail extending parallel to the adjustment direction for fastening to a vehicle floor, and a fastening rail adjustably guided on the guide rail in the adjustment direction for fastening the vehicle seat, wherein an energy absorber element, in particular an energy absorber as disclosed in more detail below, is provided in a path which introduces the force acting on the vehicle seat into the vehicle structure, which element permits a movement of the vehicle seat in the adjustment direction under plastic deformation when a predetermined value of the force is exceeded.

According to the present invention, an adjustment element for adjusting the vehicle seat in the adjustment direction is guided on the guide rail or on the fastening rail and is coupled to the guide rail, wherein the fastening rail can be adjusted relative to the adjustment element in the adjustment direction with deformation of the energy absorber element, when the predetermined value of the force acting on the vehicle seat is exceeded.

The coupling of the fastening rail to the adjustment element is not released during driving or during normal adjustment of the vehicle seat, for example for a comfort setting, and remains fixed. In the event of a crash, on the other hand, the coupling between the fastening rail and the adjustment element is released and the fastening rail can move in the guide rail relative to the adjustment element. An energy absorber is integrated between the fastening rail and the adjustment element. During driving or during normal adjustment of the vehicle seat, the energy absorber is firmly coupled to the fastening rail and the adjustment element. In the event of a crash, the energy absorber is still firmly coupled to the fastening rail and the adjustment element. The energy absorber converts the crash energy. The adjustment element, which is coupled to the guide rail, remains coupled to the guide rail in the event of a crash and transfers the crash energy to the seat frame or vehicle structure. The fastening rail guides the entire seat in a defined direction in the event of a crash.

The adjustment element may be a rail profile designed in the manner of a conventional upper rail, which is preferably relatively short and guided in the guide rail. The guide rail itself is preferably designed in the manner of a conventional lower rail and serves to fasten the respective seat rail to the floor of a vehicle body. The actual vehicle seat is fastened to the second upper rail. The second upper rail is expediently designed as a relatively long rail section which is also guided in the guide rail. The two upper rail segments represent separate components which are suitably coupled to one another.

According to a further embodiment, the energy absorber element is coupled via a breakaway member in the path that introduces the force acting on the vehicle seat into the vehicle structure, the breakaway member being destroyed when the predetermined value of the force is exceeded. This allows the rigid coupling between the fastening rail and the adjustment element to be released, allowing relative movement between the fastening rail and the adjustment element while the energy absorber is deformed.

According to a further embodiment, the energy absorber element and the breakaway member are interchangeably mounted in or on the seat rail pair so that the vehicle seat can be returned to its original condition prior to a crash event after the installation of new replacement parts and can continue to be used.

According to a further embodiment, the energy absorber element is coupled via a locking device having a predetermined triggering threshold in the path that introduces the force acting on the vehicle seat into the vehicle structure. When the triggering threshold is exceeded, i.e., when the predetermined value of the force acting on the vehicle seat is exceeded, the locking device is unlocked or released, thereby releasing an adjustment of the fastening rail relative to the adjustment element with deformation of the energy absorber element in the adjustment direction to dissipate crash energy. The locking device may thereby be unlocked purely mechanically or by activating an electric actuator.

According to a further embodiment, an electronic processing unit may be provided that is configured to generate an activation signal for activating an electric actuator and unlocking the locking device on the basis of a pre-crash input signal.

An even more flexible activation of the electric actuator can be achieved by providing electronic sensors for sensing at least one adjustment parameter of the vehicle seat and/or at least one parameter concerning the vehicle seat and for outputting corresponding signals, and by providing an electronic processing unit for processing the signals outputted by the electronic sensors, which is configured, to generate, on the basis of the signals output by the electronic sensors, the activation signal for triggering the actuator and for unlocking the locking device when the predetermined value of the force acting on the vehicle seat is exceeded and when the at least one setting parameter of the vehicle seat and/or the at least one parameter relating to the vehicle seat is respectively within a predetermined range. The triggering of an unlocking of the locking device can thus be made dependent, for example, on the current position of the vehicle seat in the adjustment direction, on the weight of a vehicle occupant, on an inclination of a seat backrest, on a rotational position of a seat part of the vehicle seat or of the vehicle seat itself, etc.

According to a further aspect of the present invention, which may also be claimed independently of the above-described seat rail pair, there is provided an energy absorber for converting crash energy in a vehicle by deformation of a deformation member, comprising a deforming member presetting the deformation and comprising a deformation member, which is designed as a tubular hollow profile extending in a longitudinal direction and is guided so that it can be displaced relative to the deforming member in the longitudinal direction, an opening having a predetermined inner profile being formed in the deformation member, the deformation member extending through the opening, wherein a displacement of the deformation member relative to the deforming member in the longitudinal direction in the event of a crash causes a deformation of the outer profile of the deformation member by the inner profile of the opening.

In the event of a crash, a section of the hollow profile that has not yet been deformed is forced through the opening of the deforming member. The inner profile of the deforming member causes the section of the hollow profile that has not yet been deformed to be deformed.

Preferably, the deformation takes place exclusively or almost exclusively as bending of wall sections of the not yet deformed section of the hollow profile. Thus, the conversion of energy may be implemented primarily by deformation (of)/bending the hollow section, thus minimizing friction. This makes the conversion of energy very controllable and reproducible because frictional effects, which otherwise worsen the reproducibility of dissipation of crash energy, are avoided according to the present invention. By varying the initial tube geometry (width, height, diameter, . . . ) and the material used, the characteristics of energy conversion can be controlled very precisely and reproducibly.

According to a further embodiment, the inner profile of the opening and the profile of the tubular hollow profile are designed such that the neutral fiber of the tubular hollow profile is identical before and after the deformation of the deformation member. For this purpose, the inner profile of the opening may vary in the longitudinal direction, in particular in accordance with a continuous function, wherein a circumferential length of the inner profile of the opening is constant for each position in the longitudinal direction. Thus, a very reproducible deformation of the tubular hollow profile can be achieved.

According to a further embodiment, the deformation member has, at least in sections, an outer profile with an n-fold rotational symmetry, where n is an integer and n is greater than or equal to three, so that torsion of the energy absorber can be effectively prevented.

According to a further embodiment, the deformation member has a plurality of pre-embossments in the radial direction, each of which is formed with mirror symmetry with respect to an axis to the geometric center of the tubular hollow profile.

According to a further aspect of the present invention, which can also be claimed independently of the seat rail pair described above and/or the energy absorber described above, there is provided a locking device for releasably locking a first component, which is guided so that it can be displaced in an adjustment direction relative to a second component in a vehicle interior of a motor vehicle, in particular for the one-time releasable locking of a component of a vehicle seat, comprising a pivotally mounted locking arm having a plurality of locking bodies which are arranged at a distance from one another in the adjustment direction and, in a locked basic position of the locking arm, each engage via associated openings which are formed in the first and second components, respectively, wherein the locking arm is pressed down into the locked basic position as long as a predetermined value of a force acting on the first component is not exceeded, and wherein the locking arm is released or de-locked when the predetermined value of the force acting on the first component is exceeded, so that the locking arm is pivoted into a release position in which the engagement of the locking bodies in the associated openings is released.

OVERVIEW ON DRAWINGS

Figure 2B:
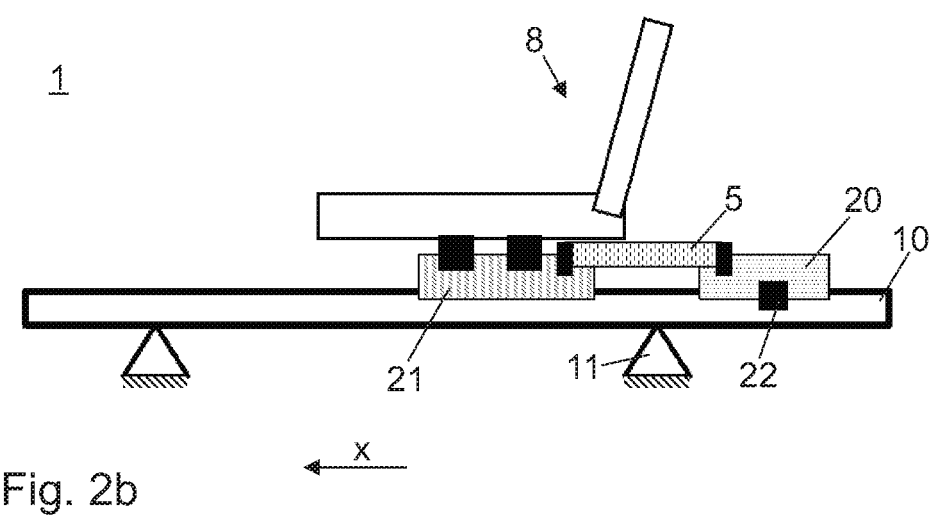
Figure 2C:
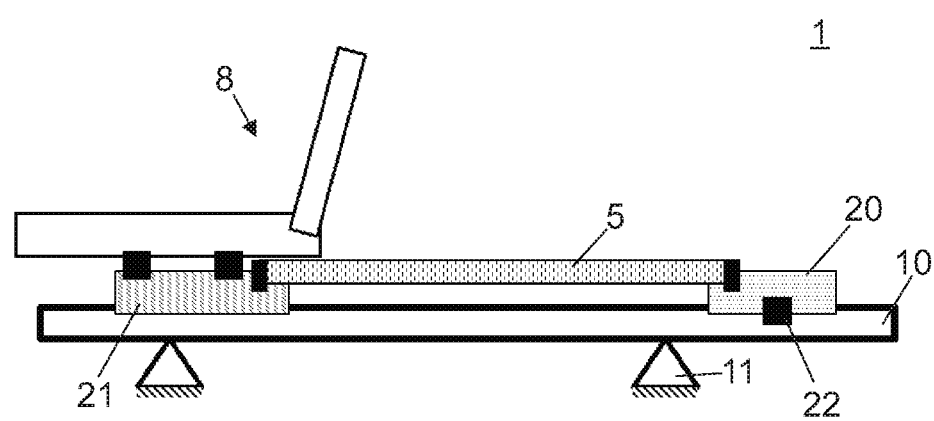
Figure 7A:
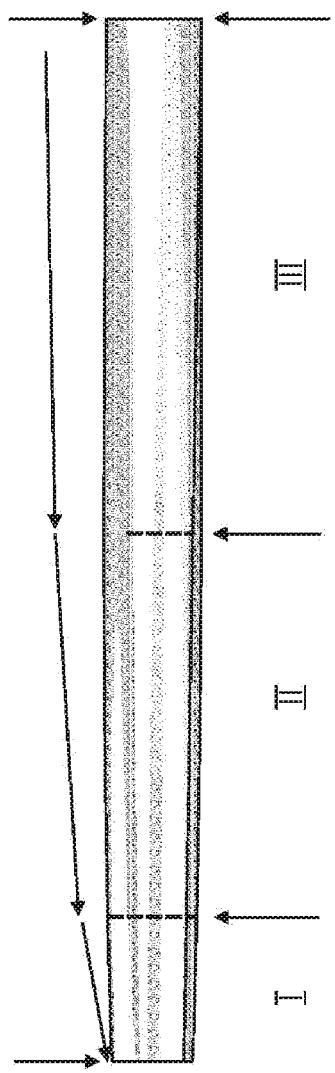
Figure 7B:
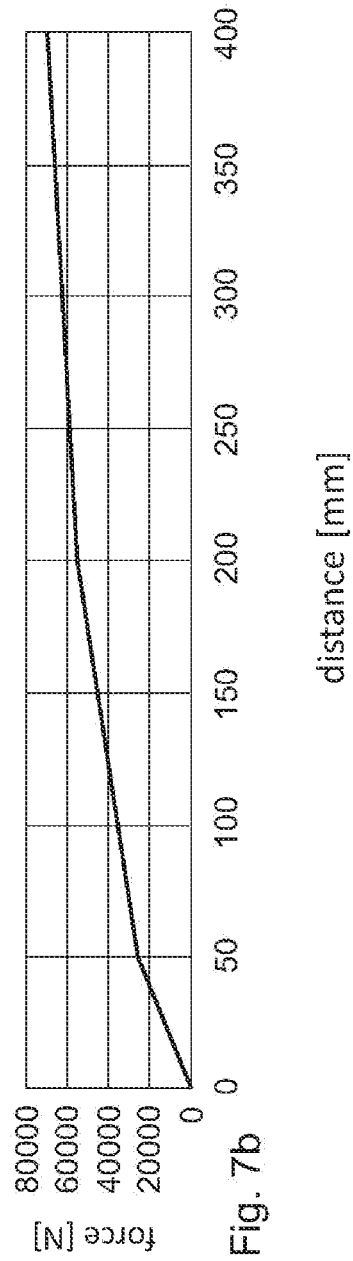
Figure 8:
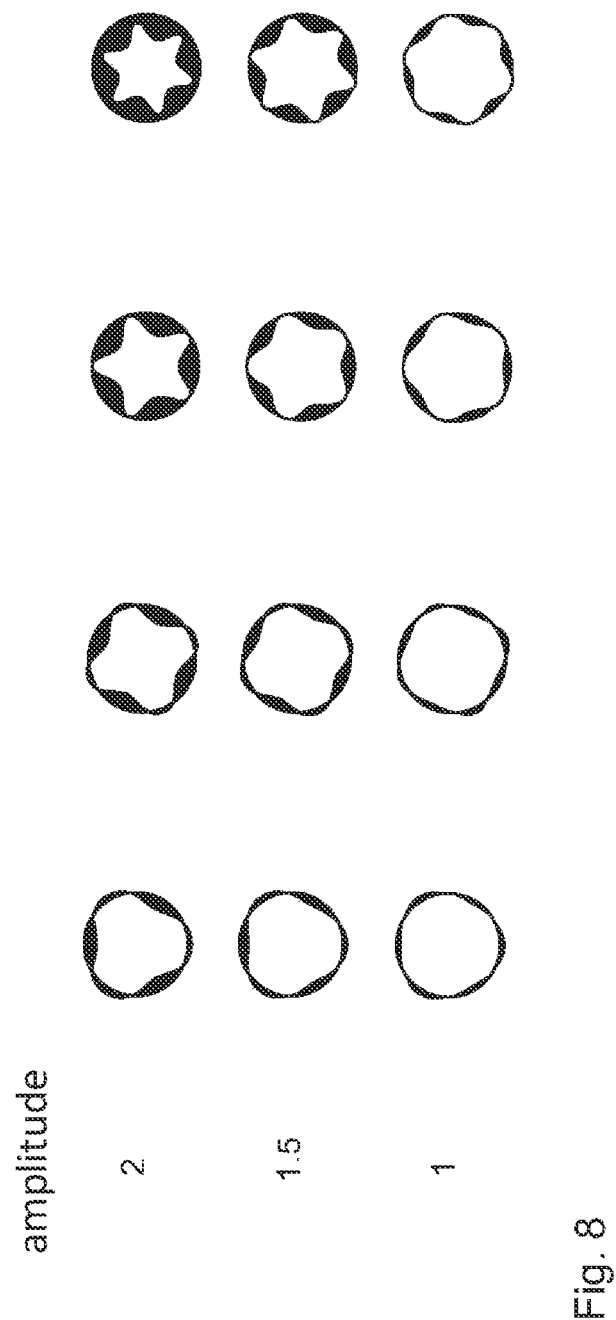
Figure 10:
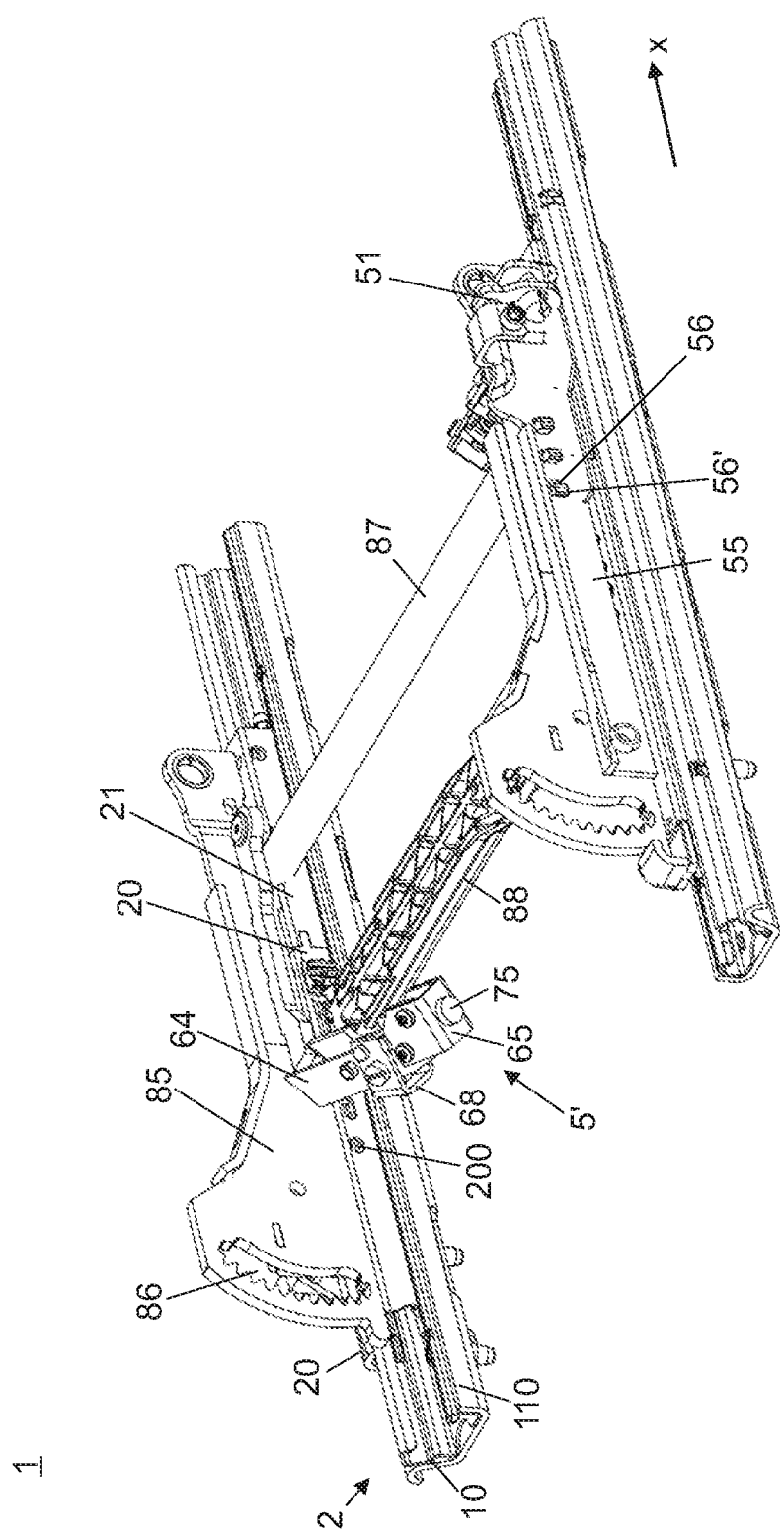
Figure 12A:
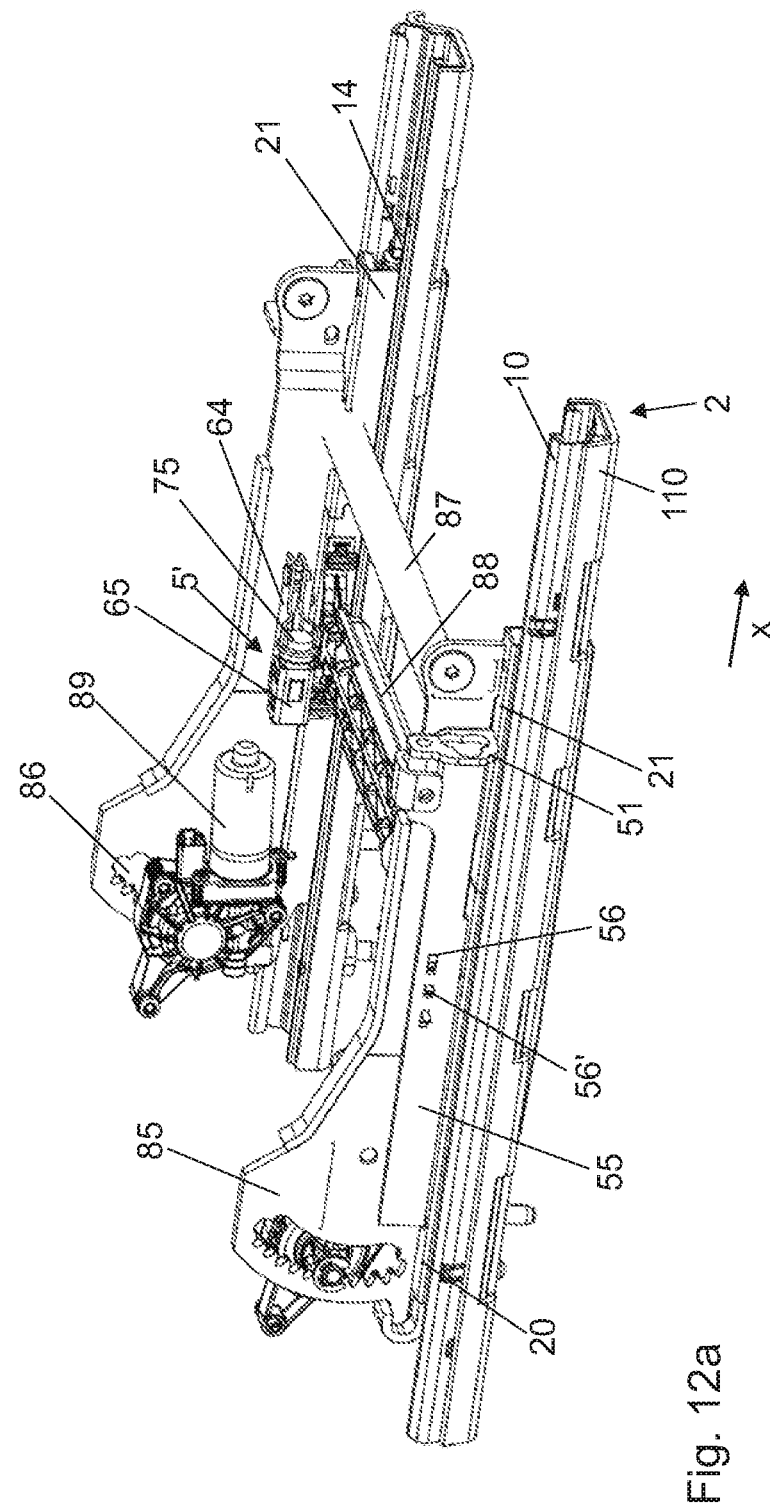
Figure 12B:
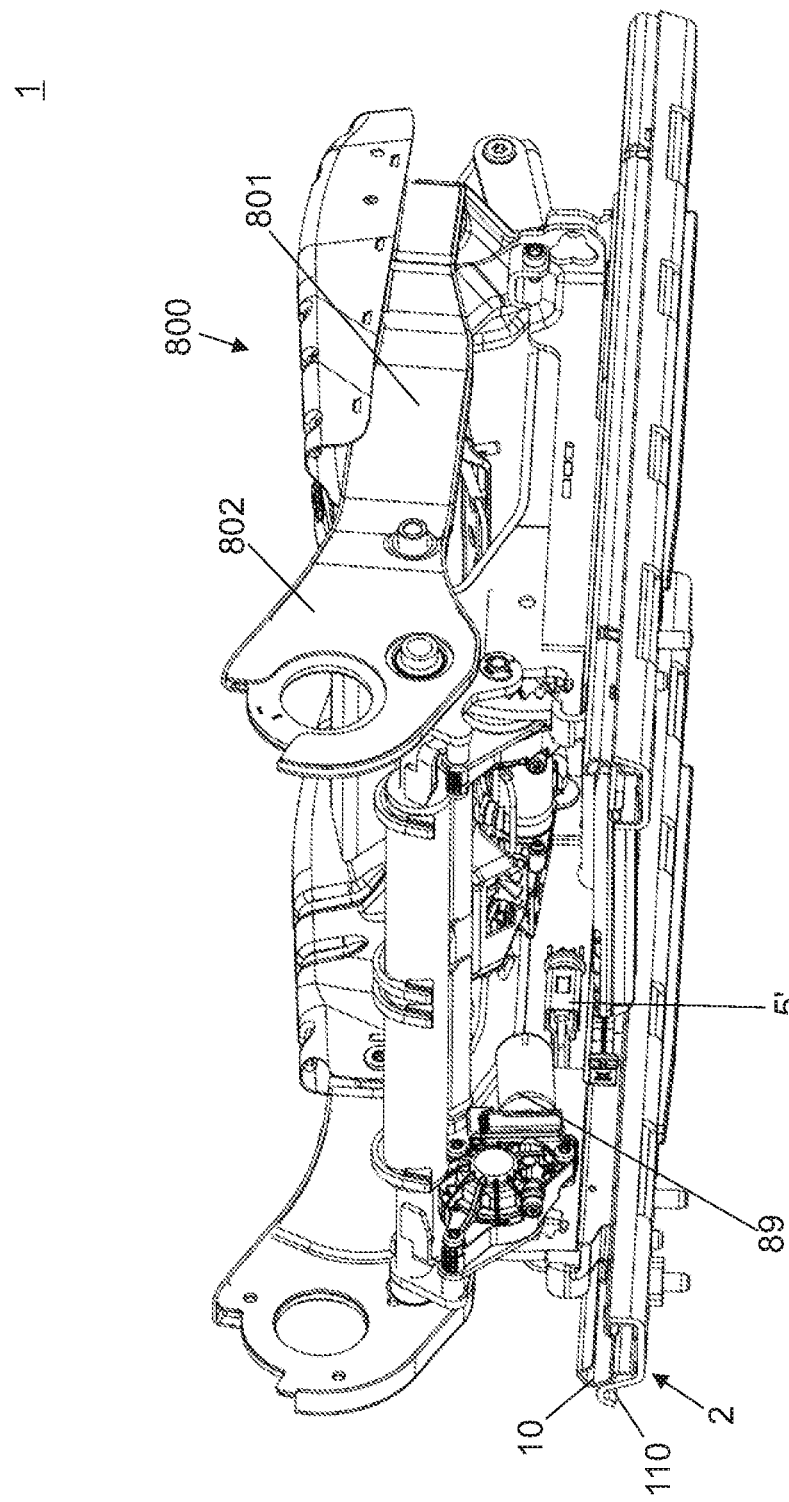
Figure 12C:
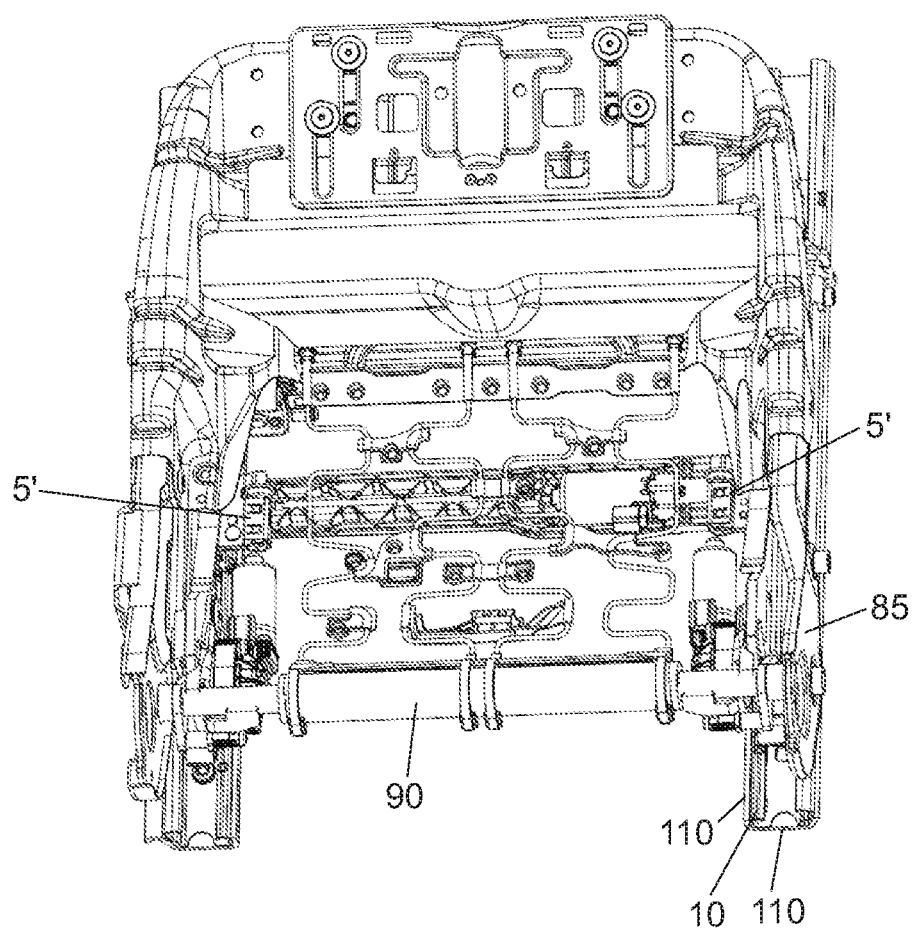
Figure 13:
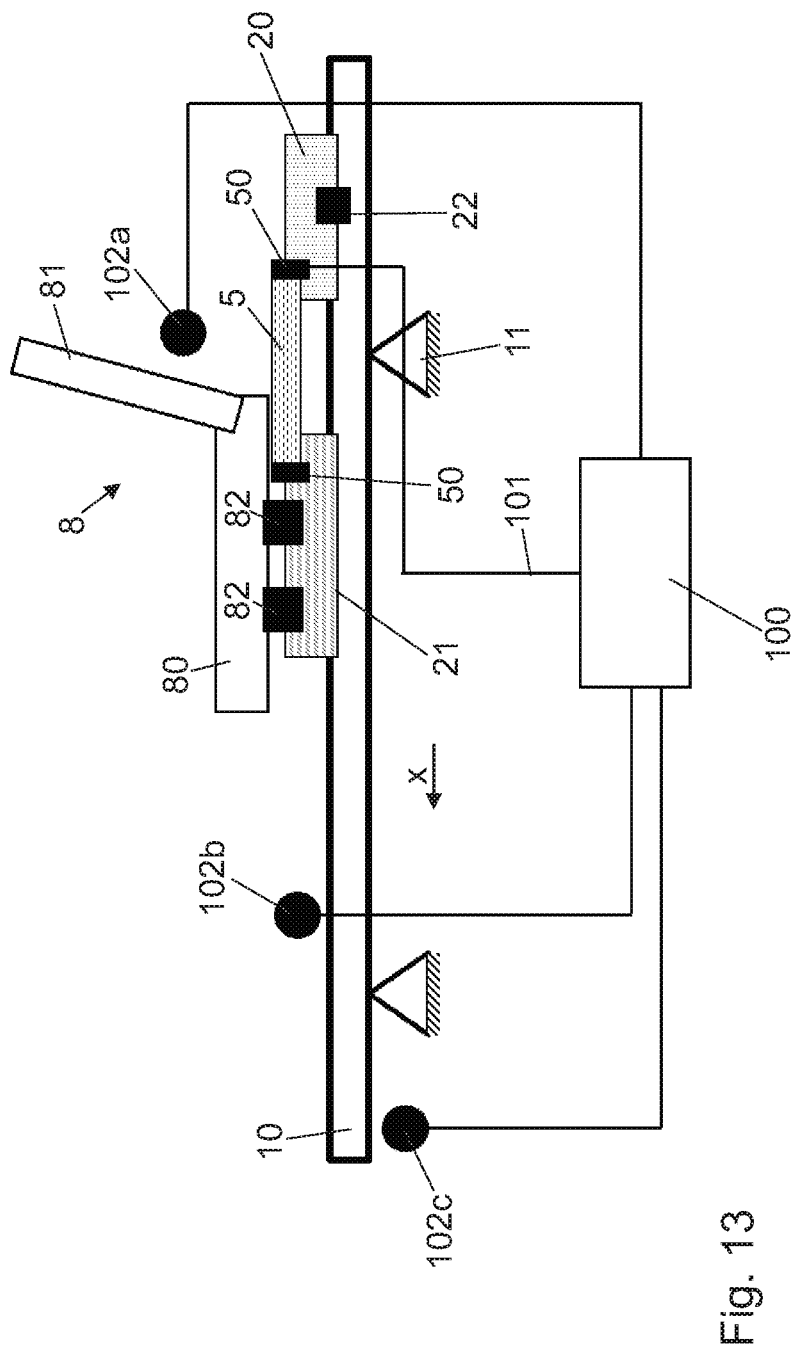

Hereinafter, the invention will be described in an exemplary manner with reference to preferred embodiments and with reference to the accompanying drawings, which show:

FIG. 1 the general configuration of a longitudinal adjustment device for longitudinal adjustment of a vehicle seat according to the present invention in a schematic view;

FIGS. 2a-2c a longitudinal adjustment device for vehicle seats according to the present invention in different longitudinal positions and in schematic views;

FIGS. 3a-3f each in a longitudinal section and in a partial perspective section, a longitudinal adjustment device for vehicle seats according to the present invention in different longitudinal positions;

FIG. 4 in a schematic representation, the basic structure of an energy absorber for a longitudinal adjustment device for vehicle seats according to the present invention;

FIGS. 5a-5e in various views, an energy absorber according to the present invention in an initial position prior to deformation of its deformation sections;

FIGS. 6a-6e in corresponding views, the energy absorber according to FIGS. 5a-5e during or after a deformation of its deformation sections;

FIG. 7a in a schematic side view, an energy absorber according to a further embodiment of the present invention;

FIG. 7b an exemplary characteristic curve of the energy absorber according to FIG. 7a;

FIG. 8 in schematic sectional views, further embodiments of an energy absorber according to the present invention;

FIGS. 9a and 9b a locking mechanism for a longitudinal adjustment device for vehicle seats according to the present invention in a locked and an unlocked position;

FIG. 10 in a schematic perspective view, a longitudinal adjustment device for vehicle seats according to the present invention with a locking mechanism according to FIGS. 9a and 9b;

FIGS. 11a-11c a further exemplary embodiment of a locking mechanism for a longitudinal adjustment device for vehicle seats according to the present invention in a locked position and in an unlocked position and in a perspective view;

FIGS. 12a-12c in various views, a longitudinal adjustment device for vehicle seats according to the present invention, comprising a locking mechanism according to FIGS. 11a-11c; and FIG. 13 in a schematic block diagram a circuit diagram, a control device for a further embodiment of a longitudinal adjustment device for vehicle seats according to the present invention.

In the drawings, identical reference numerals designate identical or technically equivalent elements or groups of elements.

DETAILED DESCRIPTION OF PREFERRED EMBODIMENTS

With reference to FIG. 1, the basic principle of a longitudinal adjustment device for a vehicle seat according to the present invention will first be explained. The longitudinal adjustment device 1 shown in FIG. 1 is formed by a lower rail generally designated by reference numeral 10 and an upper rail guided therein for longitudinal displacement in the x-direction (adjustment direction) and generally designated by reference numeral 21. The lower rail 10 is intended to be mounted on the floor of a vehicle body, while the vehicle seat 8 is attached to the upper rail 21 via mounting brackets 81. Lower and upper rails 10, 21 are each formed as profiles with a substantially U-shaped cross-section and are produced by punching and stamping from a flat sheet material of suitable strength. The two U-shaped profiles alternately engage with each other in the assembled state, thereby forming a total of two tear-resistant embracing areas which provide a high degree of mechanical stability for the longitudinal adjustment device 1. The two rails 10, 21 are guided in the adjustment direction x by guide means and kept at a distance from each other to reduce friction. The guide means may be designed as rolling members, for example as rollers, in order to achieve the lowest possible friction, but may also be designed exclusively as sliding members, for example made of a plastic material. Although specific embodiments of such rail profiles are shown in the further figures of this application, the present invention expressly shall not be deemed to be delimited to the use of these particular rail profiles, but rather may be applied to any other suitable rail profiles.

According to FIG. 1, the upper rail comprises a total of two segments, namely a second upper rail 21 to which the vehicle seat 8 is attached, and a first upper rail 20 which serves for the actual adjustment of the vehicle seat 8 in the adjustment direction x along the lower rail 10. In this sense, the first upper rail 20 may also be considered as an adjustment member for adjusting the vehicle seat 8 in the adjustment direction x, which is guided on and coupled to the lower rail 10 acting as a guide rail. Alternatively, the first upper rail 20 or the adjustment member 20 may also be guided directly in the second upper rail 21. In this case, the longitudinal adjustment can be designed for a manual or electrically driven longitudinal adjustment. In the case of a manual longitudinal adjustment of the vehicle seat 8, the first upper rail 20 may be a rail profile which is guided on or in the lower rail 10 in the manner of the second upper rail 21 and is provided with a mechanical locking device for locking a position of the vehicle seat 8 in the adjustment direction x as selected by the user, for example by means of a locking device comprising a plurality of locking pins, as disclosed in WO 2006092118 A2 of the Applicant. In the case of an electrical longitudinal adjustment of the vehicle seat 8, the adjustment element may be an adjusting device designed as a spindle drive, as disclosed by way of example in DE 102007027410 A1 of the Applicant, comprising a spindle extending along a spindle axis, which is arranged in a free space between the lower rail 10 and the first upper rail 20 and is fastened to the lower rail 10, and with a spindle nut arranged rotatably on the spindle, which is mounted in a housing and, in order to generate an adjusting force, is set in rotary motion by an electric drive motor in order to move along the spindle and transmit an adjusting force to the adjustment element 20 via a housing, as disclosed by way of example in German utility model DE 20 2006 004 613 U1 of the Applicant, the entire contents of which are hereby expressly incorporated by way of reference.

Expediently, the first upper rail 20 is accommodated and guided in a guide channel formed by the profile of the lower rail 10 or, in order to achieve the longest possible adjustment path, the first upper rail 20 is formed as a relatively short rail segment with a U-shaped profile which engages in the profile of the lower rail 10 in the manner of the second upper rail 21 in order to form two tear-resistant embracing areas.

Expediently, the adjustment element 20 thus formed is rigidly coupled to the lower rail 10 via the mechanical locking device or via the electrical longitudinal adjustment device.

In a normal operating condition, when no high accelerations or forces due to a crash are acting, the second upper rail 21 is rigidly coupled to the first upper rail 20 via a coupling device 5 which includes an energy absorber, as described in more detail below. The second upper rail 21 with the vehicle seat 8 attached thereto thus directly follows an adjustment of the first upper rail 20 or of the adjustment element 20 in the adjustment direction x. The longitudinal adjustment of the upper rail formed as a whole by the two components 20, 21 is thereby limited by end stops or the like.

As shown schematically in FIG. 1, the coupling device 5 is provided in a path via which a force acting on the vehicle seat 8 is introduced into the vehicle structure. A suitable design of the coupling device 5 ensures that the energy absorber incorporated in this path is bridged in a normal operating state, so that a rigid coupling between the two components 20, 21 is ensured in a normal operating state. For this purpose, suitably designed coupling sections 50 may be provided, via which an energy absorber is bridged in a normal operating state but which is incorporated into the path via which the force acting on the vehicle seat 8 is introduced into the vehicle structure, when a predetermined value of the force acting on the vehicle seat 8 is exceeded (i.e. in the event of a crash), so that the energy absorber then permits, under plastic deformation, a movement of the second upper rail together with the vehicle seat 8 fastened thereto in the adjustment direction x relative to the adjustment element or the first upper rail 20. During this relative movement between the second upper rail 21 and the adjustment element or the first upper rail 20, the energy absorber dissipates crash energy by material deformation. The relative movement is limited by end stops or the like to a range over which the energy absorber is capable of dissipating crash energy by material deformation.

In this way, a rigid coupling of the vehicle seat 8 with the adjustment element 20 can be achieved in a normal operating state, but in the event of a crash, when the force acting on the vehicle seat 8 exceeds a predetermined threshold value, an energy absorber can be switched in to dissipate crash energy by material deformation through a relative movement between the second upper rail 21 and the adjustment element or, respectively, the first upper rail 20 over a range over which the energy absorber is capable of dissipating crash energy by material deformation, and to thereby reduce the forces acting on the vehicle seat 8 or a vehicle occupant in the event of a crash. It may expedient for this purpose to provide the option to switch rapidly between the normal operating state and the crash state, for example by means of a rapid adjustment of the operating state of the connecting sections 50 or by means of a suitable design of a coupling device, as described in more detail below with reference to FIG. 9a ss. A switchover of the coupling between the first and second upper rails 20, 21 between the normal operating state and the crash state required for this purpose may thereby be triggered, for example, by an external electrical signal, in particular by a pre-crash signal provided by a central on-board electronic system, by signals from sensors, for example acceleration or force sensors, and by activation of an actuator, but may also be triggered purely mechanically by breaking a breakaway member, for example if the forces acting on the vehicle seat exceed a threshold value which is predetermined by an appropriate design of the mechanical strength of the breakaway member. Examples of such an activation are explained in more detail below.

In this context, the components of the longitudinal adjustment device 1 may be designed in such a manner that they can be returned to their initial (home) state or to the normal operating state of the longitudinal adjustment device 1 after a crash by replacing the energy absorber, the breakaway member and other components, for example an actuator or a connecting section 50, or by transferring a coupling device back to its initial (home) state or to the normal operating state.

These operating states of the longitudinal adjustment device 1 are schematically summarized in FIGS. 2a-2c. In a normal operating state, when the forces acting on the vehicle seat 8 do not exceed a predetermined threshold value, the second upper rail 21 with the vehicle seat 8 attached thereto and the adjustment element or the first upper rail 20 are rigidly coupled to one another via a coupling device 5. The vehicle seat 8 thus directly follows an adjustment of the adjustment element or the first upper rail 20. The vehicle seat 8 can thus be freely adjusted in the adjustment direction x between the front end position shown in FIG. 2a and the rear end position shown in FIG. 2b. In the case of a mechanical longitudinal adjustment, the desired position of the vehicle seat 8 is secured by a mechanical locking unit 22. In the case of an electrical longitudinal adjustment, the adjustment element 20 and the lower rail 10 are rigidly coupled to each other via a gear unit of the electrical longitudinal adjustment.

FIG. 2c shows the longitudinal adjustment device 1 in the event of a crash when the forces acting on the vehicle seat 8 have exceeded a predetermined threshold value. In the event of a crash, the energy absorber of the coupling device 5 is coupled or added to the path via which a force acting on the vehicle seat 8 is introduced into the vehicle structure, and the rigid coupling between the second upper rail 21 with the vehicle seat 8 attached thereto and the adjustment element or the first upper rail 20 is released or compensated, so that the energy absorber can dissipate crash energy by deformation, which may result in a certain relative movement between the second upper rail 21 with the vehicle seat 8 attached thereto and the adjustment element or the first upper rail 20, as schematically indicated in FIG. 2*c* by the stretching of the coupling device 5.

Thus, two guide systems are combined in a longitudinal adjustment device according to the present invention. On the one hand, a guide system for a classical longitudinal adjustment, for example for a comfort adjustment of the x-position of a vehicle seat in a vehicle, and an additional guide system for an absorber of crash energy in a vehicle seat. For this purpose, a lower rail acting as a guide rail is required for guidance relative to the frame or vehicle body and is permanently installed. A first upper rail or adjustment element is inserted into this lower rail to effect a fixed coupling with the lower rail, for example via a mechanical locking device displaceably guided in a longitudinal direction, via a spindle-gear unit, via a pinion-rack unit or the like. This part of the seat rail pair serves for an adjustment of the comfort position of the vehicle seat. A second upper rail is inserted into the lower rail to which the vehicle seat is attached. Both upper rails are coupled to each other, incorporating an absorber of crash energy or an energy absorber which is activated or added in the event of a crash.

The coupling between the two upper rails is not released in a normal operating state, i.e. during driving or adjustment of the comfort setting of the vehicle seat, and remains fixed. In the locked normal operating state, when the second upper rail is rigidly coupled to the first upper rail or the adjustment element, there is no play or only a very slight elastic play between the second upper rail and the first upper rail or the adjustment element, so that the vehicle seat follows an adjustment of the adjustment element or the first rail immediately, without slippage. In the event of a crash, however, the coupling is disengaged or released and the second upper rail, to which the vehicle seat is attached, is guided in the lower rail and can be adjusted over a limited distance relative to the first upper rail 20 or the adjustment element 20, with deformation of the absorber of crash energy or energy absorber, which is now coupled into the path, to dissipate crash energy. The absorber of crash energy or energy absorber functions in every position of the comfort adjustment of the vehicle seat (especially during a longitudinal adjustment).

The energy absorber is integrated between the two upper rails. During driving or adjustment of the comfort setting, the energy absorber is firmly coupled to both upper rails. In the event of a crash, the energy absorber is still firmly coupled to both upper rails, but a relative movement between the two upper rails is released. The energy absorber then converts the crash energy by deformation. The first upper rail or adjustment element remains coupled to the lower rail in the event of a crash and transfers the crash energy into the frame or vehicle structure. In the event of a crash, the second upper rail guides the vehicle seat in a defined direction specified by the lower rail. The threshold for displacement of the two upper rails is not controlled by a lock but by force via the energy absorber itself. The energy absorber is set so that it is not activated under normal operating forces and transmits the operating force and differential forces. At higher forces, e.g. due to a crash, the energy absorber is activated and the rails guide the vehicle seat.

By means of additional electronic sensors provided on the vehicle seat or in its immediate vicinity, or also by mechanically sensing setting parameters of the vehicle seat, the activation or coupling-in of the energy absorber can be made dependent on at least one setting parameter of the vehicle seat and/or on at least one parameter relating to the vehicle seat, for example on the current seat position, height or weight of a person sitting on the vehicle seat, on seat occupancy, and on any logical combinations of such parameters. Such a sensing of at least one adjustment parameter of the vehicle seat and/or of at least one parameter concerning the vehicle seat also enables the use of a longitudinal adjustment device according to the present invention in rotatable vehicle seats or in vehicle seats which are designed for autonomous driving operation and which can be adjusted into a reclined or relaxed position retracted very far towards the rear, in which conventional restraint systems, such as seat belts or even airbag systems, cannot be effective. For example, the rotational position of the vehicle seat can be sensed or determined by an electronic sensor or by a mechanical sensor when the vehicle seat is retracted rearward from a range in which restraint systems are still effective.

The energy absorber is expediently guided not by means of guide rails but by means of slotted pieces, track guides, tubes or the like.

Expediently, the energy absorber is integrated into the path that introduces the force acting on the vehicle seat into the vehicle structure in such a manner that, when it is triggered in the event of a crash, i.e. when the force acting on the vehicle seat exceeds a predefined threshold value, it can absorb crash energy both in the event of a front crash and in the event of a rear crash and dissipate the crash energy by deformation.

Due to its simple design with a small mounting space, the longitudinal adjustment device according to the present invention can be integrated in a simple and cost-effective manner into a guide system that is already existing or has been designed. Only a small number of additional components are required for the second guide system (second upper rail 21) used for this purpose, which enables a low weight and low additional costs. The longitudinal adjustment system as a whole can be designed in such a manner that the entirety of the two upper rails can be combined modularly with an existing standard lower rail.

In the following, a specific embodiment of a longitudinal adjustment device according to the present invention will be described with reference to FIGS. 3*a*-3*f*. This is shown in accordance with the positions shown in FIGS. 2*a*-2*c*, in each case in a longitudinal section and in a perspective partial section. Here, the lower rail 10 and the two upper rails 20, 21 may be designed as profiles which are U-shaped in cross-section, as disclosed, for example, in WO 2011147991 A1 of the Applicant.

As shown in FIGS. 3*a* and 3*b*, a seat rail pair of a longitudinal adjustment device 1 according to the present invention comprises in each case a lower rail 10 and two upper rails 20, 21, each of which is designed as a profile which is U-shaped in cross section. A threaded spindle 14 is held on the bottom of the lower rail 10 by means of mounting brackets 12, 13 in the interior of the respective seat rail, in which a spindle nut of a gear 23 is engaged, which is driven by means of an electric motor (not shown) for longitudinal adjustment of the vehicle seat. While the second upper rail 21, to which the vehicle seat is attached, is usually relatively long, the first upper rail 20 can be designed to be relatively short in order to optimize the available maximum adjustment travel of the seat rail pair. The two upper rails 20, 21 are guided independently of one another on or in the lower rail 10.

A coupling device 5 including an energy absorber is firmly connected to the first and second upper rails 20, 21. The energy absorber may be designed in particular as a tubular hollow profile, as described in more detail below with reference to FIGS. 4 to 6e. The energy absorber may in principle also be designed in another manner to provide for a suitable, force-dependent coupling between the two upper rails 20, 21.

According to the embodiment example of FIGS. 4 to 6e, the energy absorber has a deforming die 51 with an opening defining the deformation of the hollow profile, through which the tubular hollow profile extends. The deforming die 51 is fixedly connected to the second upper rail 21 by means of a connecting section 50, so that the latter is held fixed relative to the vehicle seat. In principle, however, the deforming die 51 may also be fixed to the vehicle seat, for example to a seat subframe of the vehicle seat, or fixed in a stationary manner relative to the first upper rail 20. According to FIG. 3a, the deforming die 51 is disposed approximately at a central position on the tubular hollow profile so that the energy absorber is designed to dissipate crash energy both in the event of a rear crash and in the event of a front crash. By selecting the position of the deforming die 51 along the tubular hollow profile, more weight can be given to the design for one of the two crash scenarios, up to the limiting case of a design configured for only one of the two afore-mentioned crash scenarios.

Expediently, the tubular hollow profile of the energy absorber 5 is bridged by means of a force-dependent releasable coupling device in a normal operating state. In this case, the coupling device takes on rigid coupling between the first upper rail 20 and the second upper rail 21 with the vehicle seat attached thereto. Only in the event of a crash, when the force acting on the vehicle seat exceeds a predetermined threshold value, is this coupling released so that the two upper rails 20, 21 are then coupled to each other only via the tubular hollow profile, and deformable deformation sections 53 of the tubular hollow profile are pressed through the opening of the deforming die 51 by a crash-induced relative movement between the first and second upper rails 20, 21, which results in a deformation inside the deforming die 51 and thus in a dissipation of crash energy. The relative movement between the two upper rails 20, 21 continues until end stops terminate this relative movement.

Starting from the rear end position of the longitudinal adjustment device 1 shown in FIGS. 3a and 3b, when the gear housing 24 rests against the rear mounting bracket 13, the two upper rails 20, 21 can be transferred together, in a normal operating state, to a front end position in which the gear housing 24 rests against the front mounting bracket 12, as shown in FIGS. 3c and 3d, due to the rigid coupling with each other.

Finally, FIGS. 3e and 3f show the behavior of the longitudinal adjustment device 1 in the event of a rear crash when the vehicle seat has previously been moved to the region of a rear end position. In this case, the rigid coupling between the first upper rail 20 and the second upper rail 21 with the vehicle seat attached thereto is released, for example by releasing the coupling device 5, so that the two upper rails 20, 21 are then only coupled to each other via the tubular hollow profile, which allows a certain relative movement between the two upper rails 20, 21 and causes the formation of a gap 25 between the two upper rails 20, 21. Driven by the crash-related forces, the tubular hollow profile with the deformation sections 53 at the front end is pressed through the deforming die 51, which causes a deformation of the deformation sections 53 in the region in front of the deforming die 51 and results in deformed sections 53' behind the deforming die 51. Crash energy can be dissipated due to the deformation of the deformation sections 53 to the deformed sections 53'. Finally, the relative movement of the two upper rails 20, 21 is terminated by end stops or the like (not shown).

Details of an energy absorber for converting crash energy in a vehicle by deformation of a deformation member are described below with reference to FIGS. 4 to 6e. In this connection, FIG. 4 shows in a schematic diagram the basic structure of an energy absorber which can be used in particular in a longitudinal adjustment device for vehicle seats in accordance with the present invention, as described above.

FIG. 4 relates generally to a scenario in which an energy absorber is coupled between a component 58 fixed to the vehicle body, for example directly to a section of a vehicle body, and a separate component 59, which in the event of a crash can be adjusted over a relatively short distance in a guided manner relative to the component 58 fixed to the body, with deformation of the energy absorber. The guide required for this purpose is generally designated by reference numeral 54 and may be designed, for example, as a rail system, as a tube system, as a guiding device with slotted pieces or the like.

Referring to FIG. 4, a tubular hollow profile according to the present invention comprises a preformed section 52 having a first outer profile and a deformation section 53 adjoining the preformed section 52 in the longitudinal direction x and having a second outer profile. A deforming die 51 acting as a deforming member is arranged between the preformed section 52 and the deformation section 53, the deforming die 51 having an opening through which the tubular hollow profile extends. It is assumed that the deforming die 51 is stationary relative to the component 59. The inner profile of the opening of the deforming die 51 is formed to correspond to the first outer profile of the preformed section 52. The second outer profile of the deformation section 53 is formed different to the first outer profile, at least in sections, and extends radially beyond the first outer profile, at least in sections.

In the event of a crash, forces act on the separate component 59 which accelerate the separate component 59 together with the deforming die 51, which is stationary with respect thereto, in the direction of the component 58 fixed to the vehicle body and press the deformable deformation section 53 of the tubular hollow profile through the opening of the deforming die 51. Because the second outer profile of the deformation section 53 is formed at least in sections different from the first outer profile and extends at least in sections radially to beyond the first outer profile, this results in deformation of the deformation section 53 in the radial direction by bending. The deformable deformation section 53 of the tubular hollow profile is further pressed through the opening of the deforming die 51 under deformation to dissipate additional crash energy between the two components 58, 59. In the process, the component 59 moves closer and closer to the stationary component 58 until finally the deforming die 51 has come close to the stationary component 58 and most of the deformation section 53 has been deformed. In this state, any further movement of the component 59 toward the stationary component 58 is stopped by end stops or the like, which may be provided, for example, in the guide device 54.

Figure 5C:
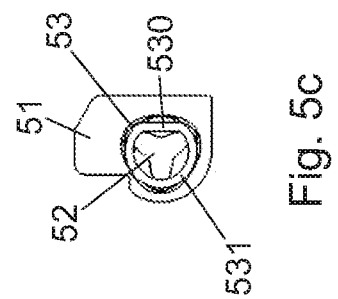
Figure 5A:
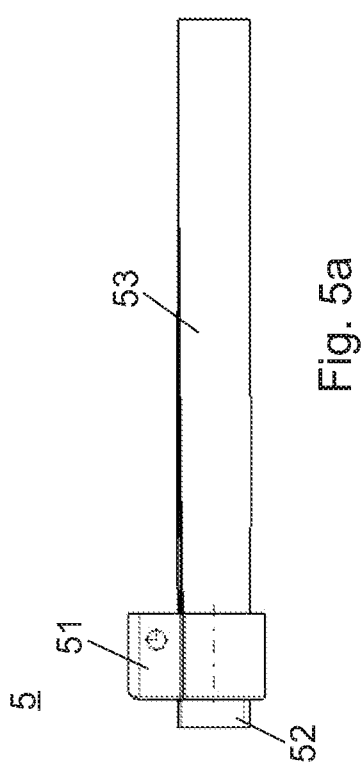
Figure 5B:
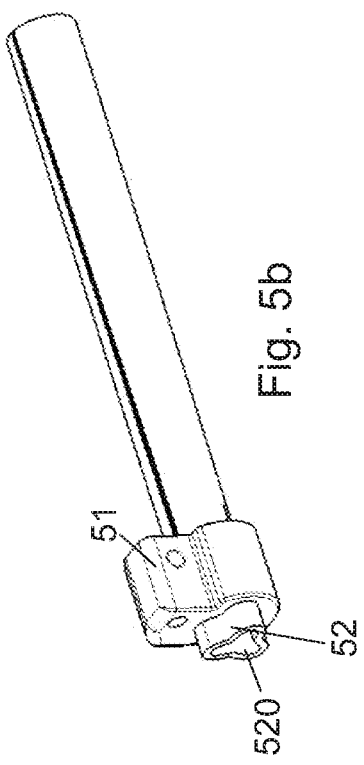
Figure 5E:
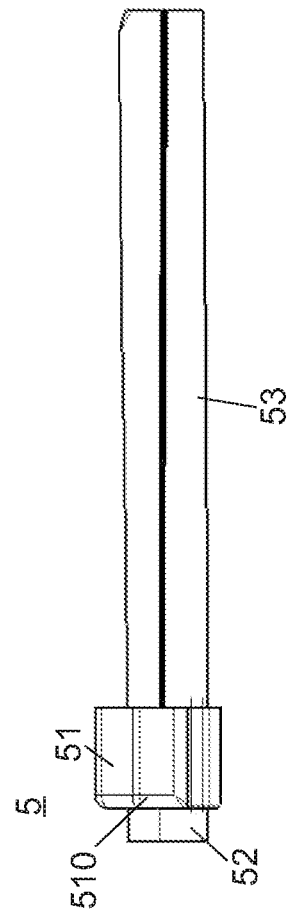
Figure 5D:
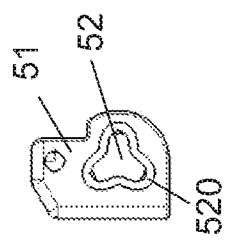
Figure 6E:
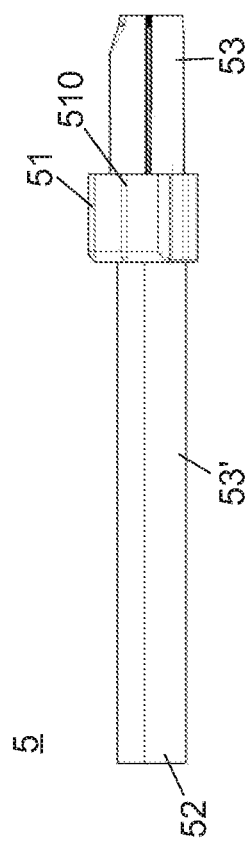
Figure 6D:
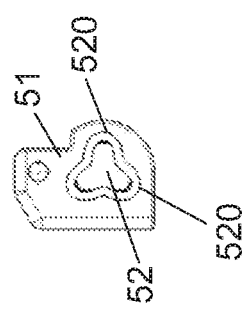

In the plan view onto the left end face of the tubular hollow profile shown in FIG. 5d, the profile of the preformed section 52 can be seen to comprise a plurality of side wings 520 or preforms in the radial direction which may be uniformly curved and each of which may be mirror symmetrical in shape. The side wings 520 impart to the tubular hollow profile, at least in sections, an outer profile having an n-number rotational symmetry, where n is an integer and n is greater than or equal to three. In this case, the outer profile of the preformed section 52 corresponds to the inner profile of the opening formed in the deforming die 51, which defines the deformation of the deformation section 53 as it passes through the opening.

In the plan view onto the right end face of the tubular hollow profile shown in FIG. 5c, the profile of the deforming section 53 can be seen to extend radially, at least in sections, beyond the outer profile of the preformed section 52, so that the deforming section 53 is deformed when it is plunged through the opening of the deforming die 51. In the illustrated embodiment, the outer profile of the deformation section 53 is formed by a smooth, substantially linearly extending sidewall 530 and a circularly curved sidewall 531 enclosing an approximately three-quarter circle, both the smooth sidewall 530 and the curved sidewall 531 being spaced radially further from the center of the tubular hollow profile than the side wings of the preformed section or in the opening of the forming die 51.

Thus, when the deformation section 53 is forced into the opening of the deforming die 51 in the event of a crash, sections of the smooth sidewall 530 and the curved sidewall 531 are bent radially inward, forming a profile with side wings arranged in an n-numbered rotational symmetry, corresponding to the outer profile of the preformed section or opening in the deforming die 51.

The inner profile of the deforming die 51 and the outer profile of the deformation section 53 are thereby matched to each other in such a way that the deformation section 53 is preferably formed exclusively by bending into a profile corresponding to the inner profile of the deforming die 51 and the outer profile of the preformed section 52.

FIGS. 6a-6e show the energy absorber 5 in a state in which most of the deformation section 53 has already been pushed through the opening in the deforming die 51 to form the deformation section 53', the profile of which corresponds to the profile of the preformed section 52 or the inner profile of the opening in the deforming die 51.

According to the present invention, the conversion or reduction of crash energy acting on the vehicle occupant is thereby achieved by radial deformation of a tubular hollow profile. For this purpose, the crash element is forced and/or pushed through a second element in the event of a crash with the aid of the crash energy, for example a tube through a die. When the tube is forced through the die, the tube is radially deformed by bending. In this process, the internal shape of the die defines the forming and final shape of the tubular hollow profile. During the crash, the crash energy is converted into deformation energy, thus reducing the loads on the vehicle occupant.

The conversion of crash energy is primarily implemented by deformation/bending, whereby friction is minimized. This makes the conversion of crash energy very controllable and reproducible. Friction, on the other hand, worsens the reproducibility of the conversion of crash energy. By varying the initial tube geometry (for example width, height, diameter, . . . ) and the material used, the maximum energy conversion can be controlled very well according to the invention.

The maximum energy conversion can be controlled very well via the degree of deformation (initial geometry compared to final geometry), which is determined by means of the tube geometry and die geometry.

By means of the material thickness of the tubular hollow profile, the maximum level of energy conversion can be adjusted very well, even using the same geometry of tube and die.

The path of the energy conversion can be controlled very well by means of the length of the tubular hollow profile.

Due to the good adjustability of the maximum level of energy conversion, the energy absorber element is very easy to scale and can thus be applied to different crash load scenarios, vehicle types, loads, absorber paths, etc. with little additional effort for the design.

Because the conversion of crash energy is primarily based on the mechanism of a deformation of the deformation section, the result is a very smoothly running characteristic curve of the energy conversion. Additional force pulses, as occur in particular with folding crash absorbers and are caused by a strongly fluctuating characteristic curve, can be avoided according to the present invention.

The characteristic curve of the conversion of crash energy and the respective force level can be controlled very well via the pre-embossment of the tubular hollow profile. Not only can the maximum height of the characteristic curve be controlled in a simple manner, but also the course of the characteristic curve as a whole. As a result, the energy absorber can be used as a crash energy conversion element for various crash load scenarios. For example, the energy absorber can be designed in a simple manner for different weights, different speeds, different types of vehicles, etc. In principle, the more deformation travel (i.e. tube length) available, the higher the deformation force that can be achieved with the energy absorber. In principle, a soft stop function can also be achieved by means of a sharp rise in the characteristic curve of the energy absorber.

The inner contour of the deforming die 51 is expediently designed so that the neutral fiber of the tube cross section are identical before and after deformation. For this purpose, the inner profile of the opening of the deforming die 51 varies in the longitudinal direction x. In particular, it varies in the longitudinal direction x in accordance with a continuous function, wherein a circumferential length of the inner profile of the opening of the deforming die 51 is constant for each position in the longitudinal direction x. This guarantees a uniform deformation of the tubular hollow profile over the complete stroke and guarantees that the neutral fiber of the tube cross-section is not changed. The initial geometry can also be used with a mathematical circular equation for round geometries.

In principle, a combination of deformation and tapering of the tubular hollow profile can also be used, in which case the neutral fiber of the tubular cross section before the crash can be different to the neutral fiber of the tubular cross section after the crash.

With reference to FIGS. 7a and 7b, ways of influencing the characteristic curve of the tubular hollow profile for energy conversion by deformation are described below. In section I, the outer diameter of the preformed section increases linearly with three radial preforms, assuming that the outer diameter of the preformed section corresponds to the inner diameter of the profile in the deforming die right at the beginning. A corresponding linear increase in the characteristic curve of the conversion of crash energy results if the wall thickness of the tubular hollow profile is constant in all areas of section I.

In section II, the outer diameter of the preformed section continues to increase linearly, with the outer profile in section II gradually changing from a profile with radial preforms corresponding to the inner profile of the opening in the deforming die to a profile corresponding to the profile of the aforementioned deformation section 53. This results in a steeper slope of the characteristic curve of the conversion of crash energy in section II.

Finally, in section III, the outer diameter of the tubular hollow profile is constant, with the profile of the tubular hollow profile in section III corresponding to the profile of the aforementioned deformation section 53. This results in slope of the characteristic curve of the conversion of crash energy in section III, which is again smaller.

Sections with different pre-embossment are thus provided along the tubular hollow profile, whereby a progressive force-displacement characteristic curve of the tubular hollow profile can be controlled in a targeted manner A similar progressive characteristic curve force vs. displacement can also be generated by increasing the material thickness of the hollow section.

As will be readily apparent to those skilled in the art, the application of an energy absorber for converting crash energy is not limited to a longitudinal adjustment device for vehicle seats, but can be used quite generally with any vehicle components mounted in the interior of a vehicle for the purpose of dissipation of crash energy by deformation. Examples include, in particular, vehicle seats, components of a vehicle door, such as a side impact guard, or a knee impact element of a vehicle console.

FIG. 8 shows schematic sectional views of further embodiments of an energy absorber according to the present invention. The characteristic curve of the conversion of crash energy of the tubular hollow profile can be suitably adapted by the number of pre-embossments in the radial direction as well as the wall thickness in the pre-embossments. The outer profile of the tubular hollow profile always corresponds to an n-numbered rotational symmetry, where n is an integer and n is greater than or equal to three.

In the following, FIGS. 9a and 9b will be used to describe a first embodiment of a locking device which is generally suitable for releasably locking a first component relative to a second component which is guided so that it can be displaced in an adjustment direction in a vehicle interior of a motor vehicle. The locking device is designed to be unlocked very quickly in the event of a crash. In particular, the locking device may be associated with an energy-absorbing element arranged in a path through which a force acting on a vehicle seat is introduced into the vehicle structure. In a normal operating condition, when the forces acting on the vehicle seat do not exceed a predetermined threshold, the locking device may provide a rigid coupling between the vehicle seat and the vehicle structure, for example by directly coupling the two upper rails to each other in a seat rail pair, as described above with reference to FIGS. 2a to 3f. On the other hand, in the event of a crash, when the forces acting on the vehicle seat exceed the predetermined threshold, the locking device can rapidly release (de-lock) the rigid coupling between the vehicle seat and the vehicle structure to enable a movement of the vehicle seat relative to the vehicle structure, for example between the two upper rails in a seat rail pair, as described above with reference to FIGS. 2a to 3f. However, because the energy absorber element is still coupled into the path through which the force acting on a vehicle seat is introduced into the vehicle structure, crash energy can thus be effectively dissipated at an early stage of a crash by deformation of the energy absorber element.

FIG. 9a shows the locking device 5' in a locked state. It comprises a locking arm 60 having a plurality of locking bodies 62, which are designed as wedge-shaped teeth, which are arranged at a distance from one another in the adjustment direction x and which, in the locked basic position of the locking arm 60, engage through openings 28, 28', which are formed in a first mounting bracket 27 and a second mounting bracket 27', respectively. The two mounting brackets 27, 27' are representative here of the first and second components, respectively, which are intended to be rigidly coupled to one another in a normal operating state and whose coupling is intended to be rapidly released by releasing the locking device 5' in the event of a crash. It shall be assumed for the following, that the second mounting bracket 27' is arranged stationary relative to the vehicle structure, and that the first mounting bracket 27 is guided so that it can be displaced relative to the second mounting bracket 27' or the vehicle structure in the event of a crash.

The locking arm 60 is mounted so that it can be pivoted about a pivot axis 61 at a first end of the locking arm 60. The locking arm 60 is pushed downward by a locking pawl 66 into the locked basic position according to FIG. 9a, as long as a predetermined value of a force acting on the first mounting bracket 27 is not exceeded. When the predetermined value of the force acting on the first mounting bracket 27 is exceeded, on the other hand, the locking arm 60 is released or disengaged so that it can be pivoted about the pivot axis 61 into a released position according to FIG. 9b, in which the engagement of the locking teeth 62 with the associated openings 28, 28' of the two mounting brackets 27, 27' is released and the first mounting bracket 27 is displaceable relative to the second mounting bracket 27' or the vehicle structure.

The locking device 5' further comprises a pivotably mounted intermediate member 68, which in the illustrated embodiment is formed as a U-shaped profile and is mounted so that it can be pivoted about a different axis 69 than the locking pawl 66. In principle, it may be sufficient if the threshold value for triggering the locking device 5' in the event of a crash is predetermined by the strength characteristics of a breakaway member 71 which secures the locking pawl 66 or the pivotably mounted intermediate member 68 and prevents their pivoting movement for unlocking the locking pawl 66 as long as a predetermined value of the force acting on the first mounting bracket 27 is not exceeded. For this purpose, it may be sufficient for a plunger 76 mounted on a housing portion 65 of the locking device 5' to permanently bias the pivotably mounted intermediate member 68 against the locking pawl 66 with a high force in a normal operating condition. If the pre-tensioning force becomes too high due to crash forces, the breakaway member 71, for example a bolt, breaks. After destruction of the breakaway member 71, the pivotably mounted intermediate member 68 is first pivoted downward about the pivot axis 69 so that it thereby acts on a rear portion of the locking pawl 66 to pivot the locking pawl 66 upward to release a pivotal movement of the locking arm 60 about the pivot axis 61 to release engagement of the locking teeth 62.

To drive this pivoting movement, the front and rear flanks 63a, 63b of the locking teeth 62 are each inclined at an acute angle with respect to a perpendicular to the locking arm 60, so that a relative displacement of the first mounting bracket 27' relative to the second mounting bracket 27 drives pivoting of the locking arm 60 to the release position as shown in FIG. 9*b* because the flanks 63*a*, 63*b* of the locking teeth 62 slide along the edges of the openings 28, 28' in the mounting brackets 27, 27'.

In other words, due to the wedging effect caused by the locking teeth 62, a relative movement of the two mounting brackets 27, 27' in the event of a crash, when the breakaway member 71 is destroyed and the locking pawl 66 is released, generates a transverse force and in the x-direction. This causes the locking arm 60 to rotate under its own power. In this case, it may be sufficient if the self-locking of the locking arm 60 is generated by a suitably designed breakaway member.

According to a preferred embodiment, the self-locking of the locking arm 60 is generated by the pivotably mounted intermediate member 68, which is released by activating an electric actuator by destroying the breakaway member 71. For this purpose, the electric actuator must respond quickly. According to the present invention, an electrically operable actuator is preferred for this purpose, which includes a pyrotechnic gas generator that is triggered when the activation signal is applied.

The pyrotechnic gas generator comprises an ignition unit and a solid propellant. The ignition unit is activated by a current pulse from a control unit. This ignites the solid propellant, which may be in tablet form. The resulting hot gas flows through a metal filter from the gas generator into a gas-tight chamber, which drives a plunger 76 that destroys the breakaway member 71. Such pyrotechnic gas generators are sufficiently well known from airbag systems.

As an alternative, a gearbox, lifting solenoid, shape memory actuator, piezoelectric actuator or the like may be used to release the locking device 5'. As an alternative to the pyrotechnic drive, a motor or a pneumatic drive could be used.

FIG. 10 shows a specific mounting situation of such a locking device 5' according to FIGS. 9*a* and 9*b* in a longitudinal adjustment device for vehicle seats. First of all, additional components for connecting the vehicle seat to the seat rail pair 2 are shown, including two mounting brackets 85 which are each attached to the second upper rails 21 and to which the vehicle seat is attached. A groove-type guide 86 for adjusting the angle of inclination of the backrest is shown at the rear end of the mounting brackets 85. The two mounting brackets 85 are rigidly connected to each other via transverse members 87, 88. Locking units 5' as shown in FIGS. 9*a* and 9*b* are provided on the rear transverse member 88 on the inside of the longitudinal adjustment device 1. When triggered in the event of a crash, these release the rigid coupling between the two upper rails 20, 21 to permit a relative movement between the two upper rails 20, 21. For the dissipation of crash energy, an energy absorber is coupled into the path that introduces the force acting on the vehicle seat into the vehicle structure via the first upper rail 20 and the lower rail 10, as described above with reference to FIGS. 4 to 8. The energy absorber is provided on the inner side of a carrier 55 and dissipates energy by deformation in the event of a crash, as described above. The engagement of locking teeth of the locking device 5' in associated detent openings is released by activating a pyrotechnic gas generator 75 of the locking device 5' to release the relative movement between the two upper rails 20, 21 with the energy absorber interposed.

FIGS. 11*a*-11*c* show a further embodiment of a locking device 5' according to the present invention. Here, the pyrotechnic actuator 75 is secured to a first housing portion 65 formed by two outwardly bent retaining arms 640 forming a cylindrical receiving opening and a rectangular receiving space, wherein a gap or retaining groove 641 is formed between the rectangular receiving space and the cylindrical receiving opening in which a clamping ring 642 securely retains a radial projection of the pyrotechnic actuator 75. The pyrotechnic actuator 75 itself is secured to the rectangular receiving space of the housing section 65 by means of retaining clips 650.

In the normal operating condition shown in FIG. 11*a*, when the prevailing forces do not exceed a predetermined threshold, one end of the pivotably mounted locking pawl 66 is in direct contact with the front end of the pyrotechnic actuator 75. Rotational movement of the locking pawl 66 is prevented by a locking pin 71, designed as a breakaway member, which is secured in openings on the housing section 64. At its opposite other end, the locking pawl 66 is mounted for rotational movement about axis 67. The other end of the locking pawl 66 pushes the pivotably mounted locking arm 60 downward so that the locking teeth 62 engage in associated detent openings 28, 28' in the manner described above to block a relative displacement between the two brackets 27, 27'.

In the event of a crash, when the prevailing forces exceed a predetermined threshold, the pyrotechnic actuator 75 is electronically activated so that the plunger is propelled forward by ignition of the ignition unit of a pyrotechnic gas generator, causing the locking pawl 66 to first destroy the locking pin 71 and then the locking pawl 66 to further pivot about the axis 67 until finally the other end of the locking pawl 66 releases the locking arm 60 and no longer pushes it downward. The chamfered front and rear flanks 62*a*, 63*b* of the locking teeth 62 then actively drive further upward pivoting of the locking arm 60 due to the onset of relative displacement between the two mounting brackets 27, 27' in cooperation with edges of the associated detent openings 28, 28' until finally the engagement of the locking teeth 27, 27' with the associated detent openings 28, 28' is fully released and the release position shown in FIG. 11*b* is reached.

The shaping of the locking teeth 62 is designed to more effectively drive the upward pivoting of the locking arm 60 into the release position. As can be seen from FIGS. 11*a*-11*c*, the closer the locking teeth 62 are arranged to the rear end of the locking arm 60 with the pivot axis 61 located there, the more they are bent backward. Thus, the locking teeth 62 are wedged into the associated detent openings 28, 28' with different angles of inclination. While the angle of inclination of the first locking tooth 62—as viewed from the pivot axis 61—at which it is inclined rearwardly in the direction of the pivot axis 61 is greatest and is about 20 degrees in the illustrated embodiment, this angle of inclination becomes smaller and smaller the further apart the respective locking tooth 62 is from the pivot axis 61. As can be seen from FIG. 11*a*, the foremost locking tooth 62 spaced furthest from the pivot axis 61 engages almost perpendicularly in the associated detent openings 28, 28'. The opening widths of the associated detent openings 28, 28' are suitably adapted to this geometry of the locking teeth 62. As can be further seen from FIGS. 11*a*-11*c*, the lengths of the locking teeth 62 are also different. More specifically, the length of the first locking tooth 62—as viewed from the pivot axis 61—is smallest and the length of the locking teeth 62 becomes longer and longer the further apart the respective locking tooth 62 is located from the pivot axis 61. The forward free ends of the locking teeth 62 enclose an envelope E that is curved with a progressively decreasing pitch starting from the region of the pivot axis 61 and progressively away from the locking arm 60.

In a locking device 5' according to the present invention, it is important to rapidly destroy or break the breakaway member in order to release the locking of the locking device 5', which can be achieved in particular by means of a pyrotechnic actuator. Due to the inertial force, the vehicle seat generates its own rotary drive for the locking teeth during a crash, which locking teeth are comb-like and beveled, and thus no external rotary drive is required to pivot the locking arm. Overall, the system enables a very short opening time.

A locking device 5' according to the present invention can be manufactured in a simple and inexpensive manner using stamped parts and/or injection molded parts. The two embodiments described above can also be used in a belt integral seat without major modifications, and thus both locking devices 5' can also accommodate higher crash loads.

FIGS. 12a-12c show a specific mounting situation of such a locking unit 5' according to FIGS. 11a-11c in a longitudinal adjustment device for vehicle seats. The locking units 5' are provided on the rear transverse member 88 on the inside of the longitudinal adjustment device 1. When triggered in the event of a crash, these release the rigid coupling between the two upper rails 20, 21 to enable a relative movement between the two upper rails 20, 21. For the dissipation of crash energy, an energy absorber is coupled in the path that introduces the force acting on the vehicle seat into the vehicle structure via the first upper rail 20 and the lower rail 10, as described above with reference to FIGS. 4 to 8. The energy absorber is provided on the inner side of a carrier 55 and dissipates energy by deformation in the event of a crash, as described above. The engagement of locking teeth of the locking device 5' in associated detent openings is released by activating a pyrotechnic gas generator 75 of the locking device 5' to release the relative movement between the two upper rails 20, 21 with the interposition of the energy absorber.

As already explained above, the release of a locking device for a vehicle seat can in principle be controlled purely mechanically. Thus, it may be sufficient to determine the release behavior of the locking device purely mechanically by means of the mechanical characteristics of the aforementioned breakaway member and its integration into the path via which a force acting on a vehicle seat is introduced into the vehicle structure. In addition, provisions may be made to release a triggering of the locking device by releasing the pivoting movement of the aforementioned locking arm only if setting parameters of the vehicle seat, which are sensed purely mechanically, are within a predetermined range. Examples of such setting parameters may be: a position of the vehicle seat in the longitudinal direction of the seat rail pair (for example, if the vehicle seat has been reclined far backward into a relax or rest position for an autonomous driving application in which personal restraint systems, such as airbags or seat belts, are no longer effective, it may be advantageous for the locking device not to be released, so that the rigid coupling of the two upper rails remains in place and the vehicle seat can be moved more quickly back into the area in which personal restraint systems are effective), an angle of inclination of the backrest of the vehicle seat (if the backrest is inclined too far backwards, for example, it can be advantageous if another securing system first raises the backrest again before, if applicable the aforementioned locking device is triggered), an angle of rotation of the vehicle seat (if the vehicle seat is twisted sideways or rotated backwards by 180 degrees, it may be advantageous if the aforementioned locking device is not triggered but other securing systems are activated instead). Such adjustment parameters of the vehicle seat can in principle be sensed purely mechanically, for example by means of control cams or depressing members or by means of area-dependent latching or release of securing bolts or the like, the respective position of which is either directly coupled to the breakaway member or blocks an adjustment of an element that destroys a breakaway member.

Preferably, however, a locking device is released under the control of an electronic system, which requires electrical or piezoelectric actuators, in particular also a pyrotechnical gas generator, which releases an unlocking of the locking device by destroying a breakaway member or rapidly adjusting a component. For this purpose, the locking device may receive in particular a pre-crash signal from the on-board electronics or an activation signal from a central processor of the vehicle's on-board electronics, which triggers the electrical actuator of the locking device.

The triggering of the locking device can also be influenced or controlled by output signals from sensors, which is explained below by way of example with reference to FIG. 13, which illustrates a system for controlling a locking device 5 for a vehicle seat 8, which is designed as described above. In this system, one or more sensors 102a-102c are arranged in the vehicle seat 8 and/or in its surroundings, for example optical, electronic or magnetic sensors, which sense at least one setting parameter of the vehicle seat 8 or a parameter concerning the vehicle seat 8, and output a signal corresponding to the setting parameter to a control device 100, for example to a processing unit, which may also be integrated in the on-board electronics and logic. On the basis of the respective signal output from an electronic sensor, the control device 100 then generates an activation signal that is output to the electric actuator of the locking device 5 via a line 101 to trigger the unlocking of the locking device 5.

In the calculation of the activation signal, on the one hand, the force acting on the vehicle seat 8 can be included. Thus, the activation signal is output by the control device 100 only when the force acting on the vehicle seat 8 exceeds a predetermined value. However, the generation of the activation signal may additionally be dependent on at least one output signal of the sensors 102a-102c associated with the vehicle seat 8. In particular, the control device 100 may also logically associate output signals of the sensors 102a-102c with each other and further may also logically associate them with the value of the force acting on the vehicle seat 8.

For example, if one of the sensors 102a-102c senses that the vehicle seat is displaced to a far forward position, i.e., very far forward into the immediate vicinity of a front airbag, it may be advantageous not to trigger an unlocking of the locking device to prevent the vehicle seat from being displaced even further forward toward the front airbag and a vehicle dashboard after an unlocking of the locking device. Or, if one of the sensors 102a-102c senses that the vehicle seat has been reclined far rearward into a relax or rest position for an autonomous driving application, for example, in which personal restraint systems, such as airbags or seat belts, are no longer effective, it may be advantageous to not trigger an unlocking of the locking device so that the rigid coupling of the two upper rails remains in place and the vehicle seat can be reclined more quickly into the range in which personal restraint systems are again effective. Or, if one of the sensors 102a-102c senses that the backrest has been reclined too far backward, for example, it may be advantageous for another restraint system to first recline the backrest before the aforementioned locking device is triggered, if applicable. Or, if one of the sensors 102a-102c senses on the basis of an angle of rotation of the vehicle seat that the vehicle seat is rotated laterally or rotated 180 degrees backward, it may be advantageous not to trigger an unlocking of the locking device but to activate other securing systems.

The sensors 102a-102c can be used to sense a variety of different adjustment parameters of the vehicle seat 8 and/or parameters concerning the vehicle seat 8. Examples include: a position of the vehicle seat 8 in the adjustment direction x, an angle of inclination of the backrest 81 of the vehicle seat 8, an adjustment of the height of a seat portion 80 of the vehicle seat 8, an angle of inclination of the seat portion 80 of the vehicle seat 8, a seat occupancy, the weight of a vehicle occupant sitting on the vehicle seat 8, a height of the vehicle occupant, parameters regarding the geometry of the vehicle interior in the vicinity of the vehicle seat 8, the setting of the height and/or angle of inclination of a headrest of the vehicle seat 8.

A locking device, as described above, is in principle suitable for many other applications in vehicles. Examples are as follows: In the case of a longitudinal adjustment for a seat unit, releasing a movement of a pretensioned seat unit can take place in the event of a pre-crash in order to quickly achieve a directed seat position in the x-direction, in which person restraint systems, e.g. an airbag, are then effective. In the case of an active head restraint, which is preloaded with a spring, a rapid adjustment of the head restraint in the x- and/or z-direction can be accomplished by triggering the locking device.

In combination with an energy absorber, as described above, further advantageous effects can be achieved. Examples include: The locking device can release a rapid rotational movement on the seat pan of a vehicle seat during a crash to deform a component or assembly with an energy absorber element. In an adjustment device for adjusting the angle of inclination of a backrest or backrest head, the locking device may release a rapid rotational movement at the backrest head during a crash to deform a component or assembly with an energy absorber element.

As will be readily apparent to the skilled person studying the foregoing description, a seat rail pair as described above, an energy absorber with a tubular hollow profile as described above, and a locking device as described above can be integrated into a vehicle seat unit, if necessary together with an electronic control system of an appropriately design, so that crash energy can be effectively dissipated with deformation of the energy absorber when a predetermined value of the force acting on the vehicle seat is exceeded. This can further increase safety for vehicle occupants.

LIST OF REFERENCE NUMERALS 1 longitudinal adjustment device
2 seat rail
5 coupling device with energy absorber
5' releasable coupling device
8 vehicle seat
10 lower rail
11 vehicle floor
110 guide channel in vehicle floor
12 front mounting bracket
13 rear bracket
14 threaded spindle
20 first upper rail
200 opening
21 second upper rail
22 releasable locking device
23 gearbox/spindle nut
24 gearbox housing
25 gap
27 first mounting bracket
27' second mounting bracket
28 opening in first mounting bracket
28' opening in second mounting bracket
50 connecting section
51 deforming die
510 deforming section of deforming die 51
52 preformed section of hollow profile
520 side wing of preformed section 52
53 deformation section of hollow profile
530 smooth side wall
531 curved side wall
53' deformed section of hollow profile
530' side wing of deformed section 53'
54 guiding device
55 carrier for energy absorber
56 latching opening in carrier 55
56' locking body
58 body fixed component
59 second component
60 pivoting locking arm
61 pivot axis
62 locking tooth
63a front flank of locking tooth 62
63b rear flank of locking tooth 62
64 first housing section
640 retaining arm
641 retaining groove
642 clamping ring
65 second housing section
650 retaining clips
66 locking pawl
67 pivot axis of locking pawl 66
68 rotatable intermediate member
69 pivot axis of rotatable intermediate member 68
70 guide recess
71 breakaway pin
72 receptacle of breakaway pin 71
75 pyrotechnic actuator
76 plunger
80 seat part
800 seat pan
801 lateral support
802 adjustment fitting for inclination of backrest
81 backrest
82 mounting bracket/seat base
85 mounting bracket
86 adjustment guide for inclination of backrest
87 transverse member
88 transverse member
89 motor/gear unit for adjustment of inclination of backrest
90 swivel axis for adjustment of inclination of backrest
100 central processing unit
101 signal line
102a-102c sensor
x adjustment direction
E envelope

The invention claimed is:

1. A seat rail pair (2) for adjustment of a motor vehicle seat (8), comprising
a guide rail (10) running parallel to the adjustment direction (x) for fastening to a vehicle floor, and a fastening rail (21) adjustably guided on the guide rail (10) in the adjustment direction (x) for fastening the motor vehicle seat (8), wherein an energy absorber element (5) is provided in a path which introduces the force acting on the motor vehicle seat (8) into the vehicle structure, said energy absorber element permitting a movement of the motor vehicle seat in the adjustment direction (x) under plastic deformation when a predetermined value of the force is exceeded, and an adjustment element (20) for adjusting the motor vehicle seat (8) in the adjustment direction (x) is guided on the guide rail (10) or on the fastening rail (21) and is coupled to the guide rail (10), wherein the fastening rail (21) can be adjusted relative to the adjustment element (20) in the adjustment direction (x) with deformation of the energy absorber element (5) when the predetermined value of the force acting on the motor vehicle seat (8) is exceeded, wherein the energy absorber element (5) is coupled into the path introducing the force acting on the motor vehicle seat (8) into the vehicle structure via a locking device (5'), which is unlocked when the predetermined value of the force is exceeded to allow an adjustment of the fastening rail (21) relative to the adjustment element (20) in the adjustment direction (x) with deformation of the energy absorber element (5), wherein the adjustment element is designed as a rail (20) which is guided on the guide rail (10) and can be locked to the guide rail (10).

2. The seat rail pair as claimed in claim 1, wherein the adjustment element (20) is rigidly coupled to the fastening rail (21) as long as the predetermined value of the force is not exceeded.

3. The seat rail pair as claimed in claim 1, wherein the adjustment element can be locked to the guide rail (10) after a manual adjustment of the motor vehicle seat (8) in the adjustment direction (x).

4. The seat rail pair as claimed in claim 1, wherein the adjustment element is designed as a spindle drive with a spindle (14) extending along the adjustment direction (x) and a spindle nut (23) which is arranged rotatably on the spindle, which is mounted in a housing (24) and which, in order to generate an adjustment force, can be set in rotary motion in order to move along the spindle (14) and transmit the adjustment force to the fastening rail (21) via the housing (24).

5. The seat rail pair as claimed in claim 4, wherein the adjustment element (20) is guided within the guide rail (10).

6. The seat rail pair as claimed in claim 1, wherein the adjustment element comprises a pinion that engages a rack provided in the guide rail (10) and moves along the rack upon rotation to transmit the adjusting force to the fastening rail (21).

7. The seat rail pair as claimed in claim 1, wherein the energy absorber element (5) is coupled via a breakaway member (71) in the path that introduces the force acting on the motor vehicle seat (8) into the vehicle structure, and wherein the breakaway member is destroyed when the predetermined value of the force is exceeded.

8. The seat rail pair as claimed in claim 7, wherein the energy absorber element (5) and the breakaway member (71) are interchangeably installed in the seat rail pair (2).

9. The seat rail pair as claimed in claim 7, wherein the energy absorber element (5) and the breakaway member (71) are interchangeably installed on the seat rail pair (2).

10. The seat rail pair as claimed in claim 1, wherein the locking device (5') comprises a pivotally mounted locking arm (60) with a plurality of locking bodies (62) arranged at a distance from one another in the adjustment direction (x), wherein the locking arm (60)

as long as the predetermined value of the force is not exceeded, is pressed down into a locked basic position, in which the locking bodies (62) engage in associated openings (28, 28'), for coupling the adjustment element (20) rigidly to the fastening rail (21), and is released or disengaged when the predetermined value of the force is exceeded, so that it is pivoted into a release position in which the engagement of the locking bodies (62) in the associated openings (28, 28') is released.

11. The seat rail pair as claimed in claim 10, wherein the pivoting movement of the locking arm (60) into the release position is released or disengaged only when adjustment parameters of the motor vehicle seat, which are sensed mechanically, are within a predetermined range.

12. The seat rail pair as claimed in claim 1, further comprising:

at least one electrically actuatable actuator (75) that unlocks the locking device (5') upon input of an activation signal, and an electronic processing unit (100) configured to generate the activation signal for unlocking the locking device (5') on the basis of a pre-crash input signal.

13. The seat rail pair as claimed in claim 12, further comprising: electronic sensors (102a-102c) for sensing at least one adjustment parameter of the motor vehicle seat and/or at least one parameter concerning the motor vehicle seat and for outputting corresponding signals, and the electronic processing unit (100) for processing the signals outputted by the electronic sensors to generate, on the basis of the signals outputted by the electronic sensors, the activation signal for triggering the actuator (75) and unlocking the locking device (5') when the predetermined value of the force is exceeded and the at least one adjustment parameter of the motor vehicle seat and/or the at least one parameter concerning the motor vehicle seat is within a predetermined range, respectively.

14. The seat rail pair as claimed in claim 1, wherein the energy absorber element is adapted to convert crash energy by deforming a deformation member (5) and comprises:

a deforming member (51) providing the deformation, and a deformation member (5) which is designed as a tubular hollow profile extending in a longitudinal direction (x) and is guided displaceably relative to the deforming member (51) in the longitudinal direction (x), wherein an opening with a predetermined inner profile is formed in the deforming member (51), the deformation member (5) extends through the opening, and a displacement of the deformation member (5) relative to the deforming member (51) in the longitudinal direction (x) in the event of a crash causes a deformation of an outer profile of the deformation member (5) by the inner profile of the opening.

15. The seat rail pair as claimed in claim 14, wherein the inner profile of the opening causes a radial deformation of the outer profile of the deformation member (5) upon displacement of the deformation member (5) relative to the deforming member (51) in the longitudinal direction (x) in the event of a crash.

16. The seat rail pair as claimed in claim 14, wherein the inner profile of the opening and the profile of the tubular hollow profile are designed such that a neutral fiber of the tubular hollow profile is identical before and after the deformation of the deformation member (5).

17. The seat rail pair as claimed in claim 16, wherein the inner profile of the opening varies in the longitudinal direction (x), in particular in accordance with a continuous function, and a circumferential length of the inner profile of the opening is constant for each position in the longitudinal direction (x).

18. The seat rail pair as claimed in claim 14, wherein the deformation member (5) has, at least in sections, an outer profile with an n-fold rotational symmetry, where n is an integer and n is greater than or equal to three.

19. The seat rail pair as claimed in claim 18, wherein the deformation member has a plurality of pre-embossings in the radial direction, which are each formed with mirror symmetry with respect to an axis to the geometric center of the tubular hollow profile.

20. The seat rail pair as claimed in claim 14, wherein a wall thickness of the tubular hollow profile is constant in the longitudinal direction (x).

21. The seat rail pair as claimed in claim 14, wherein
the deformation member (5) comprises a preformed section (52) having a first outer profile and a deformation section (53) adjoining the preformed section (52) in the longitudinal direction (x) and having a second outer profile different from the first outer profile,
the inner profile of the deforming member (51) is formed to correspond to the first outer profile, and
the second outer profile extends radially at least in sections beyond the first outer profile.

22. The seat rail pair as claimed in claim 21, wherein a wall thickness and/or the second outer profile of the deformation section (53) of the tubular hollow profile varies in the longitudinal direction (x).

23. The seat rail pair as claimed in claim 1, wherein the locking device (5') comprises
a pivotally mounted locking arm (60) having a plurality of locking bodies (62) which are arranged at a distance from one another in the adjustment direction (x) and, in a locked basic position of the locking arm (60), engage through respectively associated openings (28, 28') which are formed in a first and a second component (27, 27'), the locking arm (60) being guided in a displaceable manner in the interior of a motor vehicle, wherein the locking arm (60)
is pressed down into the locked basic position as long as a predetermined value of a force acting on the first component (27) is not exceeded, and
is released or de-locked when the predetermined value of the force acting on the first component (27) is exceeded, so that the latter is pivoted into a release position in which the engagement of the locking bodies (62) in the associated openings (28, 28') is released.

24. The seat rail pair as claimed in claim 23, wherein the locking bodies (62) each have a front and a rear flank (63a, 63b) which are each inclined at an acute angle with respect to a perpendicular to the locking arm (60), so that, when the predetermined value of the force acting on the first component (27) is exceeded, a relative displacement of the first component (27) relative to the second component (27') drives pivoting of the locking arm (60) into the release position.

25. The seat rail pair as claimed in claim 23, wherein the pivoting movement of the locking arm (60) into the release position is released or de-locked only when adjustment parameters of the motor vehicle seat, which are sensed mechanically, are within a predetermined range.

26. The seat rail pair as claimed in claim 23, further comprising:
at least one electrically operable actuator (75) that unlocks the locking device (5') upon input of an activation signal, and
an electronic processing unit (100) adapted to generate the activation signal for unlocking the locking device (5') on the basis of a pre-crash input signal.

27. The seat rail pair as claimed in claim 23, further comprising: electronic sensors (102a-102c) for sensing at least one adjustment parameter of the motor vehicle seat and/or at least one parameter concerning the motor vehicle seat, and for outputting corresponding signals, and
an electronic processing unit (100) for processing the signals output by the electronic sensors, for generating, on the basis of the signals output by the electronic sensors, the activation signal for triggering an electrically operable actuator (75) and for unlocking the locking device (5') when the predetermined value of the force is exceeded and the at least one setting parameter of the motor vehicle seat and/or the at least one parameter relating to the motor vehicle seat each is within a predetermined range.

28. The seat rail pair as claimed in claim 27, wherein the electrically operable actuator (75) includes a pyrotechnic gas generator that is triggered upon application of the activation signal.

29. The seat rail pair as claimed in claim 27, wherein the electrically operable actuator (75) unlocks the locking device (5') by destroying a breakaway member (71) coupled in a path introducing the force acting on the first component (27) into the second component (27').

30. The seat rail pair as claimed in claim 29, wherein
the locking arm (60) is pushed downward to the locked basic position by a locking pawl (66) cooperating with a pivotably mounted intermediate member (68), and
the locking pawl (66) and the pivotably mounted intermediate member (68) are mounted so as to be pivotable about different axes (67, 69) and the locking pawl (66) or the pivotably mounted intermediate member (68) are secured by the breakaway member (71) as long as a predetermined value of the force acting on the first component (27) is not exceeded.

31. The seat rail pair as claimed in claim 30, wherein
the electrically operable actuator (75), the locking pawl (66) and the pivotably mounted intermediate member (68) are jointly secured or mounted to a housing (64, 65), and
the pivotally mounted locking arm (60) and the housing (64, 65) are provided together on the first or second component (27, 27').

32. A motor vehicle seat, which is fastened to a fastening rail (21) of a seat rail pair (2) and can be adjusted in an adjustment direction (x) by adjusting the adjustment element (20), wherein
a locking device (5') is provided, for releasably locking the motor vehicle seat, wherein
an energy absorber element (5) is coupled via a breakaway member (71) in a path introducing the force acting on the vehicle seat (8) into a vehicle structure, for converting crash energy in a vehicle by deforming a deformation member (5), and
an electrically operable actuator (75) unlocks the locking device (5') by destroying the breakaway member (71)

when the predetermined value of the force acting on the vehicle seat (8) is exceeded, so that the fastening rail (21) can be adjusted relative to the adjustment element (20) in the adjustment direction (x) with deformation of the energy absorber element (5), wherein the seat rail pair (2) comprises:
- a guide rail (10) running parallel to the adjustment direction (x) for fastening to a vehicle floor, and
- the fastening rail (21) adjustably guided on the guide rail (10) in the adjustment direction (x) for fastening the motor vehicle seat (8); wherein the energy absorber element (5) is provided in a path which introduces the force acting on the motor vehicle seat (8) into the vehicle structure, said energy absorber element permitting a movement of the motor vehicle seat in the adjustment direction (x) under plastic deformation when a predetermined value of the force is exceeded; and an adjustment element (20) for adjusting the motor vehicle seat (8) in the adjustment direction (x) is guided on the guide rail (10) or on the fastening rail (21) and is coupled to the guide rail (10), wherein the fastening rail (21) can be adjusted relative to the adjustment element (20) in the adjustment direction (x) with deformation of the energy absorber element (5) when the predetermined value of the force acting on the motor vehicle seat (8) is exceeded, wherein the energy absorber element (5) is coupled into the path introducing the force acting on the motor vehicle seat (8) into the vehicle structure via the locking device (5'), which is unlocked when the predetermined value of the force is exceeded to allow an adjustment of the fastening rail (21) relative to the adjustment element (20) in the adjustment direction (x) with deformation of the energy absorber element (5); and wherein the energy absorber element (5) comprises:
- a deforming member (51) which predetermines the deformation, and
- the deformation member (5) which is designed as a tubular hollow profile extending in a longitudinal direction (x) and guided displaceably relative to the deforming member (51) in the longitudinal direction (x), wherein an opening having a predetermined inner profile is formed in the deforming member (51), the deformation member (5) extends through the opening, and a displacement of the deformation member (5) relative to the deforming member (51) in the longitudinal direction (x) in the event of a crash causes a deformation of an outer profile of the deformation member (5) by the inner profile of the opening.

33. The motor vehicle seat as claimed in claim 32, wherein the locking device (5') comprises:
- a pivotally mounted locking arm (60) having a plurality of locking bodies (62) which are arranged at a distance from one another in the adjustment direction (x) and, in a locked basic position of the locking arm (60), engage through respectively associated openings (28, 28') which are formed in a first and a second component (27, 27'), the locking arm (60) being guided in a displaceable manner in the interior of a motor vehicle, in particular for the one-time releasable locking of a component of a vehicle seat, wherein the locking arm (60)
- is pressed down into the locked basic position as long as a predetermined value of a force acting on the first component (27) is not exceeded, and
- is released or de-locked when the predetermined value of the force acting on the first component (27) is exceeded, so that the latter is pivoted into a release position in which the engagement of the locking bodies (62) in the associated openings (28, 28') is released.

* * * * *